(12) United States Patent
Juels et al.

(10) Patent No.: US 7,219,368 B2
(45) Date of Patent: May 15, 2007

(54) ROBUST VISUAL PASSWORDS

(75) Inventors: Ari Juels, Brookline, MA (US); Niklas Frykholm, Norsborg (SE)

(73) Assignee: RSA Security Inc., Bedford, MA (US)

( * ) Notice: Subject to any disclaimer, the term of this patent is extended or adjusted under 35 U.S.C. 154(b) by 931 days.

(21) Appl. No.: 09/815,560

(22) Filed: Mar. 23, 2001

(65) Prior Publication Data

US 2002/0029341 A1    Mar. 7, 2002

Related U.S. Application Data

(63) Continuation-in-part of application No. PCT/US00/03522, filed on Feb. 10, 2000, said application No. 09/815,560 is a continuation-in-part of application No. 09/544,809, filed on Apr. 7, 2000, now abandoned.

(60) Provisional application No. 60/191,708, filed on Mar. 23, 2000, provisional application No. 60/137,687, filed on Jun. 4, 1999, provisional application No. 60/119,674, filed on Feb. 11, 1999.

(51) Int. Cl.
*G06F 17/30* (2006.01)
(52) U.S. Cl. .................................. 726/2; 726/4; 726/17
(58) Field of Classification Search ........ 713/200–202; 382/181–190; 340/5.7–5.27; 726/11–15, 726/2, 4, 17
See application file for complete search history.

(56) References Cited

U.S. PATENT DOCUMENTS

| | | | |
|---|---|---|---|
| 5,226,091 A | 7/1993 | Howell et al. | |
| 5,241,594 A | 8/1993 | Kung | |
| 5,416,840 A | 5/1995 | Cane et al. | 380/4 |
| 5,425,102 A | 6/1995 | Moy | |
| 5,465,084 A * | 11/1995 | Cottrell | 382/181 |
| 5,559,961 A | 9/1996 | Blonder | 395/188.01 |

(Continued)

FOREIGN PATENT DOCUMENTS

EP        0 633 519 A1        1/1995

(Continued)

OTHER PUBLICATIONS http://www.cotse.com/tools/stega.htm.*

(Continued)

*Primary Examiner*—David Jung
(74) *Attorney, Agent, or Firm*—Wilmer Cutler Pickering Hale and Dorr LLP

(57) ABSTRACT

Enrollment and authentication of a user based on a sequence of discrete graphical choices is described. A graphical interface presents various images and memory cues that a user may associate with their original graphical choices. Enrollment may require the input to have a security parameter value that meets or exceeds a threshold. An acceptable sequence of graphical choices is converted to a sequence of values and mapped to a sequence of codewords. Both a hash of the sequence of codewords and a sequence of offsets are stored for use in authenticating the user. An offset is the difference between a value and its corresponding codeword. Authentication requires the user to enter another sequence of discrete graphical choices that is approximately the same as original. The offsets are summed with the corresponding values before mapping to codewords. Authentication requires the sequence of codewords, or a hash thereof, to match.

54 Claims, 16 Drawing Sheets

U.S. PATENT DOCUMENTS

| | | | |
|---|---|---|---|
| 5,680,470 | A | 10/1997 | Moussa et al. |
| 5,892,824 | A | 4/1999 | Beatson et al. |
| 6,069,968 | A | 5/2000 | Shaw et al. |
| 6,209,104 | B1 | 3/2001 | Jalili |

FOREIGN PATENT DOCUMENTS

| | | |
|---|---|---|
| EP | 0 677 801 A1 | 10/1995 |
| EP | 0 901 060 A2 | 3/1998 |
| WO | WO 96/18139 | 11/1995 |
| WO | WO 97/43736 | 11/1997 |
| WO | WO 97/43736 | 2/1998 |
| WO | WO 99/21073 | 10/1998 |
| WO | WO 98/52115 | 11/1998 |

OTHER PUBLICATIONS

Semantic multimedia authentication with model vector signature Ching-Yung Lin; Tseng, B.L.; Multimedia and Expo, 2004. ICME '04. 2004 IEEE International Conference on vol. 1, Jun. 27-30, 2004 pp. 435-438 vol. 1.*

An Optimized Content-Aware Authentication Scheme for Streaming JPEG-2000 Images Over Lossy Networks Zhishou Zhang; Qibin Sun; Susie Wee; Wai-Choong Wong; Acoustics, Speech and Signal Processing, 2006. ICASSP 2006 Proceedings. 2006 IEEE International Conference on vol. 2, May 14-19, 2006 pp. II-293-II-296.*

A Reversible Watermarking Scheme for JPEG-2000 Compressed Images Emmanuel, S.; Heng Chee Kiang; Das, A.; Multimedia and Expo, 2005. ICME 2005. IEEE International Conference on Jul. 6-8, 2005 pp. 69-72.*

V-go by passlogix (1 page), [on-line]. Passlogix, Inc. [retrieved on Dec. 8, 1999]. Retrieved from the Internet: <URL: http://www.passlogix.com/welcome.html>.

V-go Overview (3 pages), [on-line]. Passlogix, Inc., 1999 [retrieved on Dec. 8, 1999]. Retrieved from the Internet: <URL: http://www.passlogix.com/product/product.asp>.

Password Window Gallery (2 pages), [On-line]. Passlogix, Inc., 1999 [retrieved on Dec. 8, 1999]. Retrieved from the Internet: <URL: http://www.passlogix.com/product/gallery.asp>.

Monrose et al., "Password Hardening Based on Keystroke Dynamics," Proceedings of the 6th ACM Conference on Computer and Communications Security, pp. 73-82, Singapore (Nov. 1-4, 1999).

Graphical Passwords (2 pages), [on-line]. Monrose, Fabian [retrieved Sep. 10, 1999]. Retrieved from the Internet: <URL: http://csl.cs.nyu.edu/fabian/pilot/gpw.html>.

Rao et al., "Private-Key Algebraic-Code Encryptions" IEEE Transactions on Information Theory 35, No. 4, New York, US (Jul. 1989).

Rick, "Observations on the Application of Error Correcting Codes to Public Key Encryption" IEEE Transaction on Information Theory (1990).

Xinmei, "Digital Signature Scheme Based on Error-Correcting Codes" Electronics Letters, vol. 26, No. 13 (Jun. 21, 1990).

Chang et al., "Cryptographic Authentication of Passwords," Proceedings of the 25th Annual IEEE International Carnahan Conference on Security Technology, pp. 126-130, Taipei, Taiwan, ROC (Oct. 1-3, 1991).

Alabbadi et al., "Integrated Security and Error Control for Communication Networks Using the McEliece Cryptosystem" IEEE (Oct. 14, 1992).

"Hardware Accelerator is Public's Key to Card Security" New Electronics 27, No. 4 (Apr. 1994).

Frankel et al., "Witness-Based Cryptographic Program Checking and Applications (an announcement)" PODC (May 23, 1996).

Matsumoto, "Human-Computer Cryptography: An Attempt," Proceedings of the 3rd ACM Conference on Computer and Communications Security, pp. 68-75, New Delhi, India (Mar. 14, 1996).

Jermyn et al., "The Design and Analysis of Graphical Passwords," Eighth USENIX Security Symposium, Washington, D.C., USA (Aug. 23-26, 1999).

Perrig et al., "Hash Visulaization: A New Technique to Improve Real-World Security," Cryptographic Techniques and E-Commerce (CrypTEC '99), pp. 1-8, Hong-Kong (Jul. 5-8, 1999).

Bensinger, "Human Memory and the Graphical Password," (7 pages), [online]. Passlogix, Inc. 1998 [retrieved Sep. 7, 2000]. Retrieved from the Internet: <URL: http://www.passlogix.com/technology/white.asp?type=consumer>.

V-go Usable Security Technology (7 pages), [on-line]. Passlogix, Inc., 1999 [retrieved Sep. 7, 2000]. Retrieved from the Internet: <URL: http://www.passlogix.com/technology/white.asp?type=consumer>.

Boroditsky, "Passwords—Security Weaknesses & User Limitations," (2 pages), [on-line]. Passlogix, Inc., 1998 [retrieved Sep. 7, 2000]. Retrieved from the Internet: <URL: <http://www.passlogix.com/technology/white.asp?type=consumer>.

Dhamija et al., "Déjà Vu: A User Study Using Images for Authentication," 9th Usenix Security Symposium, pp. 1-14, Denver (Aug. 16, 2000).

NIST/NSA, "FIPS 180-2: Secure Hash Standard (SHS)", Aug. 2002.

* cited by examiner

ROBUST VISUAL PASSWORDS

CROSS-REFERENCE TO RELATED APPLICATION

This application claims priority to and the benefit of U.S. Provisional Patent Application Ser. No. 60/191,708, which was filed on Mar. 23, 2000; U.S. patent application Ser. No. 09/544,809, which was filed on Apr. 7, 2000 now abandoned; and International Patent Application Ser. No. PCT/US00/03522, which was filed on Feb. 10, 2000 and which claims priority to U.S. Provisional Patent Application Ser. No. 60/119,674, which was filed on Feb. 11, 1999, and U.S. Provisional Patent Application Ser. No. 60/137,687, which was filed on Jun. 4, 1999; all of which are incorporated by reference.

TECHNICAL FIELD

The invention relates generally to the field of security and authentication and, more particularly, to a system and method for using a graphical interface to authenticate a user.

BACKGROUND INFORMATION

Computer-based authentication systems have been used to authenticate users before providing access to computer systems, devices, and physical locations. Such systems typically make use of one or more of something a user has (such as a physical object or token), something the user knows (such as a secret), or a physical characteristic of the person (e.g. fingerprints, retina patterns, etc.).

Passwords are an example of something a person knows. They are easy to use and conceptually simple. Because they are generally alphanumeric in form and often closely related to words in natural language, passwords are relatively easy for users to remember. Typically, users can rapidly enter them through standard hardware peripherals such as keyboards. Nonetheless, in terms of their security properties, passwords have shortcomings. Typically, users derive their passwords from a limited portion of the lexicons in their native languages, making them easy to guess, particularly in automated computer attacks. An attack in which common passwords are used to guess a password is known as a dictionary attack.

The vulnerability of passwords in computer systems is becoming increasingly problematic as computing and networking technologies aim to manage increasingly sensitive information. Consumers are beginning to use smart cards and other portable devices to carry digital cash. At the same time, corporations are making sensitive information more available on their networks and are employing digital signatures in committing to legally binding contracts. Hardware devices like smart cards and authentication tokens provide cryptographic authentication for such applications; but typically the cryptographic features of these devices are secured using passwords.

It is possible to broaden the distribution of passwords that are used in a system, and thereby strengthen the system by assigning randomly generated alphanumeric passwords to users. Even users with the most retentive memories, however, have difficulty remembering more than approximately seven alphanumeric characters. The total number of such seven character passwords is about $2^{35} \approx 10^{11}$, which is too small to provide resistance against an automated computer attack on the password. Strong resistance to automated password attacks requires a password space on the order of about $2^{70} \approx 10^{21}$. This space corresponds to random, alphanumeric passwords of sixteen characters in length, which is too long for practical use by most users.

While users may have difficulty remembering passwords made up of a random alphanumeric strings, particularly if they must remember several such passwords, they may not have as much difficulty remembering other types of information or similar information in other contexts. A few examples of the other types of nonpassword data an individual may routinely remember are historical and personal events, the configuration of rooms in buildings, and the layout of city streets, not to mention the vocabulary and idioms of her native language. Some of that information may remain fixed in her memory over extended periods of time, even without frequent reinforcement.

A number of researchers have investigated the use of such everyday information in connection with mnemonic systems as a replacement for passwords. One authentication approach exploits the ability of users to recognize faces. To authenticate herself in this system, a user is asked to identify a set of familiar faces from among a gallery of photographs. While conveniently universal, this system has large memory requirements for the storage of the photographs, and has relatively slow data entry time. Another proposed approach is based on the use of routes on a complex subway system, such as the Tokyo subway system, in connection with secrets, suggesting that users could retain relatively large amounts of information in this context. This approach has the advantage of mnemonic naturalness, but has a strong disadvantage in its idiosyncrasy because not all users live in cities with subway systems or use a subway frequently.

A commercial system produced by Passlogix, Inc. of New York, N.Y. effectively extends the mnemonic approach by allowing users to select from a range of mnemonic systems. Users can, for instance, choose to use an interface displaying a room containing a collection of valuables, and encode a password as a sequence of moves involving the hiding of these valuables in various locations around the room. This method of password entry appeals to a natural mnemonic device because it resembles the medieval system of the "memory palace," whereby scholars sought to archive data mentally in an imagined architectural space. By allowing the user to select a password herself, however, this approach is vulnerable to the problem of predictability that occurs with conventional password systems. Some passwords are more popular than others, since they are easier to remember. In one example, one-third of user-selected passwords could be found in the English dictionary. Similarly, in a mnemonic system, users are more likely to pick some sequences than others. In one example, a mnemonic system allows users to trade stocks; typically, the users will choose from among the most popular stocks, as these are the easiest to remember. In seeking to guess a password in this system, an attacker is likely to gain a substantial advantage by choosing Dow Jones stocks. In principle, if user passwords are formed as sufficiently long random sequences of moves, a mnemonic system will provide an adequate level of cryptographic security. Typically, mnemonic systems are not designed to facilitate user memorization of random sequences, and may not even enforce a minimum sequence length in user password entry. A mnemonic system may also be cumbersome in terms of the user interaction involved in entering a password, in some cases demanding an involved sequence of non-uniform mouse movements to enter the password into a computer system.

Implementations of authentication systems typically use cryptographic protocols that are conventionally predicated on exact knowledge. An authentication system using RSA signatures, for example, derives its security largely from the presumption that a legitimate user with public key (N, e) possesses a corresponding secret key of the uniquely specifiable form (N, d). There are situations, however, in which human and other factors undermine the possibility of exactness in a security system. For example, in biometric systems in which users identify themselves by means of fingerprint features, variability in user interaction is such that a finger is rarely read exactly the same way twice. Moreover, there are situations in which although the original information in a system is exact, its transmission may only be approximate. For example, users typically make typing errors when entering passwords on keyboards. Similarly, data transmission channels are often subject to random noise.

An element of some cryptographic protocols is referred to as a bit commitment scheme. In a conventional bit commitment scheme, one player, whom we denote the sender, aims to conceal a bit b. The sender produces an encryption of b, denoted by y, and sends y to a second player, known as the receiver. Generally, a bit commitment scheme is such that it is infeasible for the second player to learn the bit b. Additionally, the sender later "opens" the commitment y, that is, proves to the receiver that y indeed represents an encryption of b. It is generally only feasible, however, for the sender to "open" y in one way, that is, to decrypt a unique value of b. We may view this, intuitively, as a process whereby the sender places the bit b in a safe and gives the safe to the receiver. Only the sender can open the safe, since she alone knows the combination. Moreover, she cannot change the value contained in the safe while it is in the keeping of the receiver.

An example of a bit commitment scheme is the storage of the hash of user's password in a UNIX file accessible only to the UNIX system administrator. Since the system administrator only has access to the hash of the password, the system administrator does not know what the user's plaintext password is. Nonetheless, when the user provides a password for authentication, the system administrator can compare the hash of the provided password to the stored hash and, if the hashes match, confirm that the user has provided the proper password. Bit commitment may alternatively be done, for example, using a symmetric encryption algorithm, an asymmetric encryption algorithm, a pseudo-random sequence generator, or any other one-way function.

Formally, a bit commitment scheme consists of a function $F: \{0, 1\} \times X \rightarrow Y$. To commit a bit b, the sender chooses a witness $x \in X$, generally uniformly at random. The sender then computes $y=F(b, x)$. This value y is known as a blob. It represents the bit b sealed in a "safe". To "open" or decommit the blob y, the sender produces the bit b and the witness x. The blob is successfully opened if the receiver has been convinced that y indeed represents an encryption of b. A bit commitment scheme is said to be concealing if it is infeasible for the receiver to guess b with probability significantly greater than ½. It is said to be binding if it is infeasible for the sender to decommit the blob y with the incorrect bit, that is, with (1−b). It is possible to deploy a bit commitment scheme as a commitment scheme on an arbitrarily long string of bits by committing each bit independently. The term commitment scheme shall refer to a scheme that involves commitment of a bit string c (or other potentially non-binary value) in a single blob, and for which it is possible to extract c efficiently given a witness for the blob. Thus we assume $F: C \times X \rightarrow Y$, where C is some potentially non-binary space.

Vendors of biometric authentication systems have for some time recognized the importance of achieving a practical system that stores biometric information in a non-explicit, protected form and that also can tolerate some corruption in subsequent biometric readings. To this end, the Mytec Technologies Inc. has developed an encryption process in which biometric information serves as an unlocking key. Sold under the brand name Bioscrypt™, Mytec Technologies's process overcomes the problem of corruption in biometric readings by means of Fourier transforms. While fairly efficient, however, the Bioscrypt™ process carries no rigorous security guarantees.

Davida, Frankel, and Matt have proposed a system in which a biometric template is stored in non-explicit, protected form. The Davida et al. system, described in "On Enabling Secure Applications Through Off-Line Biometric Identification," *IEEE Symposium on Privacy and Security* (May 5, 1998), requires multiple biometric readings from which the check bits may be derived. A hash of the Davida et al. template which includes the check bits is then stored. The multiple biometric readings required by the Davida et al. system may be too time-consuming to be practical or attractive for many real-world applications. Further, the Davida system does not have the necessary error tolerance to work in many real-world applications.

SUMMARY OF THE INVENTION

Like biometric systems, authentication systems that make use of visual information to authenticate users also can require storage of information in a non-explicit, protected form that can tolerate some corruption in subsequent readings. For example, in an authentication system in which a user selects an area or object on a graphical display, it may be difficult for a user that is not dexterously gifted to consistently specify a small particular area or object on a graphical display. Yet, it can be useful to allow this sort of data entry as a "visual password." Benefits of such a "visual password" are derived from the fact that it may be easier for an individual user to remember such a password, particularly if the user has other alphanumeric passwords to remember, and the fact that there presently is no obvious dictionary attack for such a password.

In co-pending U.S. patent application Ser. No. 09/544, 809, visual authentication data entry systems and methods are described. In International Patent Application Ser. No. PCT/US00/03522, a "fuzzy" commitment scheme is described that can store information in a non-explicit, protected form and that also can tolerate some corruption in subsequent readings. Here, Applicants describe methods and systems for applying fuzzy commitment to visual authentication data entry such that the visual authentication data can be stored in a protected form and also tolerate some differences in subsequent readings. Methods for user enrollment and authentication are presented, as well as implementing apparatus.

In general, in one aspect, the invention relates to a method for establishing a secret to authenticate a user. The method includes receiving on a graphical interface a secret pattern including a sequence of discrete graphical choices. The method includes converting each discrete graphical choice in the sequence of discrete graphical choices into a value to produce a sequence of values, such that the sequence of values corresponds to the sequence of discrete graphical choices. The method includes selecting a codeword associated with an error-correcting code for each value in the sequence of values to generate a sequence of codewords. A security value of a security parameter is calculated from the sequence of codewords and compared to a threshold value.

In one embodiment, the security parameter is entropy. In another embodiment, the security parameter is minentropy. In one embodiment, the method also includes rejecting the secret pattern if the security value of the security parameter does not meet or exceed the threshold value. In another embodiment, if the security value of the security parameter meets or exceeds the threshold value, the offset between each value in the sequence of values and the corresponding codeword in the sequence of codewords is calculated to generate a sequence of offsets, and the sequence of codewords is hashed to produce a hash of the sequence of codewords. In another embodiment, the method also includes storing the sequence of offsets for use in authenticating a user. In another embodiment, the method also includes storing the hash of the sequence of codewords for use in authenticating a user. In another embodiment, the method also includes transmitting the hash of the sequence of codewords to an authentication device for use in authenticating a user.

In general, in another aspect, the invention relates to a method for establishing a secret to authenticate a user. The method includes receiving a secret pattern on a graphical interface that includes a sequence of discrete graphical choices. Each discrete graphical choice in the sequence of discrete graphical choices is converted into a value to produce a sequence of values corresponding to the sequence of discrete graphical choices. A codeword from an error-correcting code is selected for each value in the sequence of values to generate a sequence of codewords. The offset between each value in the sequence of values and the corresponding codeword in the sequence of codewords is calculated to generate a sequence of offsets. The sequence of codewords is hashed to produce a hash of the sequence of codewords.

In one embodiment, a discrete graphical choice in the sequence of discrete graphical choices is a selected point on the graphical interface. In another embodiment, the method also includes displaying an image on the graphical interface after receiving the selected point on the graphical interface. In one such embodiment, each discrete graphical choice in the sequence of discrete graphical choices is associated with one of a plurality of images.

In one embodiment, the method also includes prompting a user by displaying one of the plurality of images on the graphical interface; and receiving a match pattern on the graphical interface for comparison with the secret pattern. In a related embodiment, the match pattern comprises a sequence of match points.

In one embodiment, the method also includes, during or after the step of receiving the match pattern on the graphical interface, the step of displaying the selected point associated with the image on the graphical interface. In another embodiment, during or after the step of receiving the match pattern on the graphical interface, a line from a match point to the selected point associated with the image on the graphical interface is displayed. In another embodiment, at least one memory cue is provided by presenting the memory cue in response to a point on the image on the graphical interface being highlighted. In another embodiment, a first icon from a plurality of icons is associated with a first point on the image on the graphical interface by displaying the first icon in response to the first point being highlighted, and a second icon from the plurality of icons is associated with a second point on the image on the graphical interface by displaying the second icon in response to the second point being highlighted.

In one embodiment, the method includes highlighting, for each discrete graphical choice in the sequence of discrete graphical choices, a plurality of points on the graphical interface as alternative graphical choices. In another embodiment, the sequence of offsets are stored for use in authenticating a user. In another embodiment, the hash of the sequence of codewords is stored for use in authenticating a user.

In general, in another aspect, the invention relates to a method for authenticating a user. The method includes receiving an input pattern including a sequence of discrete graphical choices on a graphical interface. Each discrete graphical choice in the sequence of discrete graphical choices is converted into an input value to produce a sequence of input values. The sequence of input values corresponds to the sequence of discrete graphical choices. A sequence of offsets is retrieved, and each input value from the sequence of input values is summed with the corresponding offset from the sequence of offsets to generate a sequence of intermediate values. A codeword is selected from a choice of codewords associated with an error-correcting code for each intermediate value in the sequence of intermediate values, thereby generating a sequence of codewords. The sequence of codewords is hashed to produce a hash of the sequence of codewords. A user is authenticated if the hash matches a stored hash.

In one embodiment, prior to the authenticating step, a stored hash is retrieved. In one embodiment, prior to the authenticating step, the hash is transmitted to an authentication device. In one embodiment, each input value in the sequence of input values is a binary value of fixed length. In one embodiment, a discrete graphical choice in the sequence of discrete graphical choices includes a selected region on the graphical interface. In one embodiment, a discrete graphical choice in the sequence of discrete graphical choices is a selected point on the graphical interface. In one embodiment, the method also includes displaying an image on the graphical interface after receiving the selected point on the graphical interface. In one such embodiment, each discrete graphical choice in the sequence of discrete graphical choices is associated with one of a plurality of images. In one embodiment, the method also includes associating an icon from a plurality of icons with a point on the graphical interface by displaying the icon when the point is highlighted.

In one embodiment, the graphical interface displays a fractal image. In a related embodiment, the method further includes adjusting the perspective of the fractal image on the graphical interface after receiving an input value in the sequence of input values. Adjusting the perspective includes zooming in and/or zooming out on the fractal image in some embodiments.

In one embodiment, a discrete graphical choice in the sequence of discrete graphical choices includes a selected icon from a plurality of icons on the graphical interface. In one embodiment, the icon on the graphical interface represents a face. In one embodiment, access to a resource is granted in response to the step of authenticating the user. In one embodiment, access is granted to one or more of a hardware device, a computer system, a portable computer, a software application, a database, and a physical location.

In general, in another aspect, the invention relates to an apparatus for establishing a secret to authenticate a user. The apparatus includes a graphical interface capable of receiving graphical input. The graphical interface receives a secret pattern as graphical input. The secret pattern includes a sequence of discrete graphical choices. The apparatus includes a converter in signal communication with the graphical interface. The converter converts each discrete graphical choice in the sequence of discrete graphical choices into a value to produce a sequence of values. The sequence of values corresponds to the sequence of discrete graphical choices. The apparatus includes a codeword generator in signal communication with the converter. The codeword generator produces a sequence of codewords by applying a decoding function of an error correcting code to each value in the sequence of values. The apparatus includes a security calculator in signal communication with the codeword generator. The security calculator calculates a security value of a security parameter from the sequence of codewords. The apparatus includes a comparator in signal communication with the security calculator. The comparator compares the security value of the security parameter to a threshold value.

In one embodiment, the security parameter is entropy, and in another embodiment, the security parameter is minentropy. In one embodiment, the apparatus also includes an offset calculator in signal communication with the comparator. The offset calculator calculates, if the security value of the security parameter meets or exceeds the threshold value, an offset between each value in the sequence of values and the corresponding codeword in the sequence of codewords to generate a sequence of offsets. The apparatus, in one embodiment, also includes a hasher in signal communication with the comparator, the hasher applies a hash function to the sequence of codewords to produce a hash of the sequence of codewords if the security value of the security parameter meets or exceeds the threshold value. In one embodiment, the apparatus also includes a memory element in signal communication with the offset calculator. The memory element stores the sequence of offsets for use in authenticating a user. In another embodiment, the memory element is in signal communication with the hasher. The memory element stores the hash of the sequence of codewords for use in authenticating a user.

In general, in another aspect, the invention relates to an apparatus for establishing a secret to authenticate a user. The apparatus includes a graphical interface capable of receiving graphical input. The graphical interface receives a secret pattern as graphical input. The secret pattern includes a sequence of discrete graphical choices. The apparatus includes a converter in signal communication with the graphical interface. The converter converts each discrete graphical choice in the sequence of discrete graphical choices into a value to produce a sequence of values. The sequence of values corresponds to the sequence of discrete graphical choices. The apparatus includes a codeword generator in signal communication with the converter. The codeword generator produces a sequence of codewords by applying a decoding function of an error correcting code to each value in the sequence of values. The apparatus, in some embodiments, includes an offset calculator in signal communication with the codeword generator, the offset calculator calculates an offset between each value in the sequence of values and the corresponding codeword in the sequence of codewords to generate a sequence of offsets. The apparatus, in some embodiments, includes a hasher in signal communication with the codeword generator. The hasher applies a hash function to the sequence of codewords to produce a hash of the sequence of codewords.

In one embodiment, a discrete graphical choice in the sequence of discrete graphical choices is a selected point on the graphical interface. In another embodiment, the apparatus also includes a point generator in signal communication with the graphical interface. The point generator highlights a plurality of points on the graphical interface as alternative graphical choices for each discrete graphical choice in the sequence of discrete graphical choices. In another embodiment, the apparatus also includes a memory element in signal communication with the graphical interface. The memory element containing a plurality of images and a sequence of images. The receipt of a discrete graphical choice in the sequence of discrete graphical choices triggers the graphical interface to display the next image in the sequence of images from the plurality of images contained in the memory element.

In one embodiment, the apparatus also includes a training logic element in signal communication with the graphical interface. The training logic element prompts a user to enter a match pattern upon receiving the secret pattern. In one embodiment, the training logic element causes the graphical interface to display the first image in the sequence of images. In one such embodiment, the match pattern is a sequence of match points. In one embodiment, the apparatus also includes a comparator in signal communication with the graphical interface. The comparator compares the match pattern to the secret pattern. In one embodiment, the training logic element causes the graphical interface to highlight the selected point associated with the image on the graphical interface. This may happen during or after receiving a match point in the sequence of match points on the graphical interface. In another embodiment, the training logic element causes the graphical interface to display a line from the match point to the selected point associated with the image on the graphical interface.

In one embodiment, the apparatus includes a memory element in signal communication with the offset calculator. The memory element stores the sequence of offsets from the offset calculator for use in authenticating a user. In another embodiment, the memory element is in signal communication with the hasher. The memory element stores the hash of the sequence of codewords from the hasher for use in authenticating a user. In one embodiment, the apparatus includes a memory element in signal communication with the codeword generator. The memory element stores the sequence of codewords from the codeword generator for use in authenticating a user.

In general, in another aspect, the invention relates to an apparatus for authenticating a user. The apparatus includes a graphical interface capable of receiving graphical input. The graphical interface receives an input pattern as graphical input. The input pattern includes a sequence of discrete graphical choices. The apparatus includes a converter in signal communication with the graphical interface. The converter converts each discrete graphical choice in the sequence of discrete graphical choices into an input value to produce a sequence of input values. The sequence of input values corresponds to the sequence of discrete graphical choices. The apparatus, in some embodiments, includes a memory element in signal communication with a summer. The memory element contains a sequence of offsets. In embodiments that include a summer, the summer is in signal communication with the converter and the memory element. The summer sums each input value from the sequence of input values with the corresponding offset from the sequence of offsets to generate a sequence of intermediate values. The apparatus includes a codeword generator in signal communication with the summer in embodiments that contain a summer, and with the converter in other embodiments. The codeword generator produces a sequence of codewords by applying a decoding function of an error correcting code. In embodiments that include a summer, the decoding function is applied to each intermediate value in the sequence of intermediate values. In embodiments that do not include a summer, the decoding function is applied to each input value from the sequence of input values. The apparatus, in some embodiments, includes a hasher in signal communication with the codeword generator. The hasher applies a hash function to the sequence of codewords to produce a hash of the sequence of codewords for use in authenticating a user.

In one embodiment, the apparatus includes a comparator in signal communication with the hasher. The comparator, in the embodiment, compares the hash of the sequence of codewords to a stored hash and produces an authentication signal if the hash of the sequence of codewords matches the stored hash. In one embodiment, the authentication signal enables access to a resource. In one embodiment, the authentication signal enables access to at least one of a hardware device, a computer system, a portable computer, a software application, a database, and a physical location.

In one embodiment, the apparatus includes a communication system in signal communication with the hasher. The communication system transmits the hash of the sequence of codewords to an authentication device and receives an authentication signal from the authentication device if the hash of the sequence of codewords matches the stored hash.

In one embodiment, a discrete graphical choice in the sequence of discrete graphical choices includes a selected region on the graphical interface. In one embodiment, a discrete graphical choice in the sequence of discrete graphical choices includes a selected point on the graphical interface. In one embodiment, a logic element in signal communication with the graphical interface causes the graphical interface to display a new image in response to the graphical interface receiving a discrete graphical choice from the sequence of discrete graphical choices. The sequence of discrete graphical choices in such embodiments corresponds to a sequence of images.

In one embodiment, the apparatus includes a comparator in signal communication with the codeword generator. The comparator, in such embodiments, compares the sequence of codewords to a stored sequence of codewords and produces an authentication signal if the generated sequence of codewords matches the stored sequence. In one embodiment, the authentication signal enables access to a resource. In one embodiment, the authentication signal enables access to at least one of a hardware device, a computer system, a portable computer, a software application, a database, and a physical location.

In another embodiment, the apparatus also includes a logic element in signal communication with the graphical interface. The logic element causes the graphical interface to display at least one memory cue in response to a point or region on the graphical interface being highlighted. In one embodiment, the logic element causes a first icon from a plurality of icons to be displayed on the graphical interface in response to a first point on the image on the graphical interface being highlighted. The logic element causes a second icon from the plurality of icons to be displayed on the graphical interface in response to a second point on the image on the graphical interface being highlighted. In one embodiment, a discrete graphical choice in the sequence of discrete graphical choices includes a selected icon from a plurality of icons displayed on the graphical interface.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

DETAILED DESCRIPTION

Figure 1:
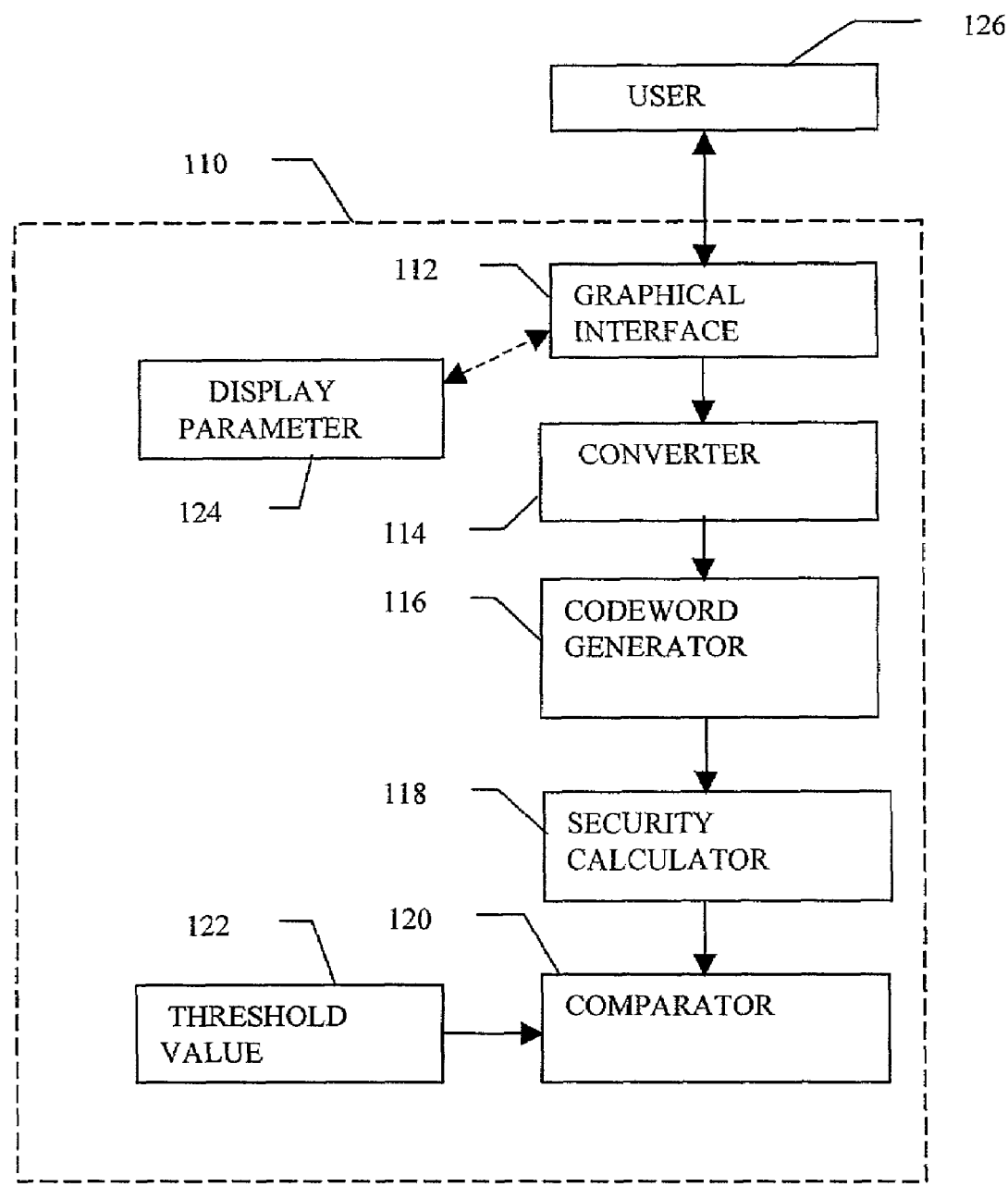
FIG. 1 is a block diagram showing an enrollment system that is one aspect of the invention.

FIG. 1 illustrates a functional block diagram of an enrollment system 110 and a user 126. The user 126 provides a secret pattern made up of a sequence of discrete graphical choices to a graphical interface 112, which is a component of the enrollment system 110. The display parameter 124, which in one embodiment is an image file, may help the user 126 to select or recall the secret pattern. The secret pattern is processed by components of the enrollment system 110 including a converter 114, a codeword generator 116, a security calculator 118, and, in conjunction with a threshold value 122, a comparator 120, to determine the secret level that characterizes the secret pattern. In one embodiment, if the secret pattern has a security value that meets or exceeds the threshold value, the secret pattern will be accepted for use in authenticating the user, as will be discussed in more detail later.

In one embodiment, the graphical interface 112 is one or more hardware devices that provide a graphical display, which can be viewed by the user 126, and that receives input from the user 126. In one embodiment, the graphical interface 112 is a CRT (cathode ray tube) with a mouse used for input. In another embodiment, the graphical interface 112 is a flat screen device, such as a liquid crystal display (LCD) or an active-matrix display device with input or touch-screen capability, or with an input or touch-screen overlaid on the display. In one embodiment, the graphical interface 112 is rectangular. In other embodiments, the graphical interface is another geometric form or shape. In one embodiment, the graphical interface 112 is a separate device that is electronically, optically, or otherwise in communication with the converter 114. In another embodiment, the graphical interface 112 is integrated into another device, such as a computer system, laptop computer, palmtop computer, other portable computer, or portable cellular telephone.

In one embodiment, the display parameter 124, the converter 114, the codeword generator 116, the security calculator 118, the threshold value 122, and the comparator 120 are implemented as a single software application program executing on a general purpose computer system. In alternate embodiments, the converter 114, the codeword generator 116, the security calculator 118, and the comparator 120 are variously implemented as individual software modules, programs, or objects, such as objects implemented in the C++ programming language. In another embodiment, one or more of the display parameter 124, the converter 114, the codeword generator 116, the security calculator 118, the threshold value 122, and the comparator 120 are combined in a hardware device or integrated chip, such as an ASIC (application-specific integrated circuit).

In another embodiment, the graphical interface 112, the display parameter 124, the converter 114, the codeword generator 116, the security calculator 118, the comparator 120, and the threshold value 122 are all part of the same computer system, laptop computer, palmtop computer, or other portable computer. In another embodiment, two or more of the graphical interface 112, the converter 114, the codeword generator 116, the security calculator 118, and the comparator 120 are separate computers or devices connected in a network, which may be a local network, or a global network, such as the Internet. The threshold value 122 and the display parameter 124 in some embodiments are contained in one or more memory elements, such as ROM or RAM. The threshold value 122 and/or the display parameter 124 in various embodiments are stored on a CD-ROM, a network, a smartcard, a personal digital assistant (PDA), a magnetic strip which may be attached to a card the approximate size of a credit card, or a bar code.

The converter 114, the codeword generator 116, the security calculator 118, and the comparator 120, in conjunction with a threshold value 122, are all used by the enrollment system 110 to perform the enrollment process. Their individual functions are described in more detail with respect to the steps, illustrated in FIG. 2, which are part of the enrollment process.

Figure 2:
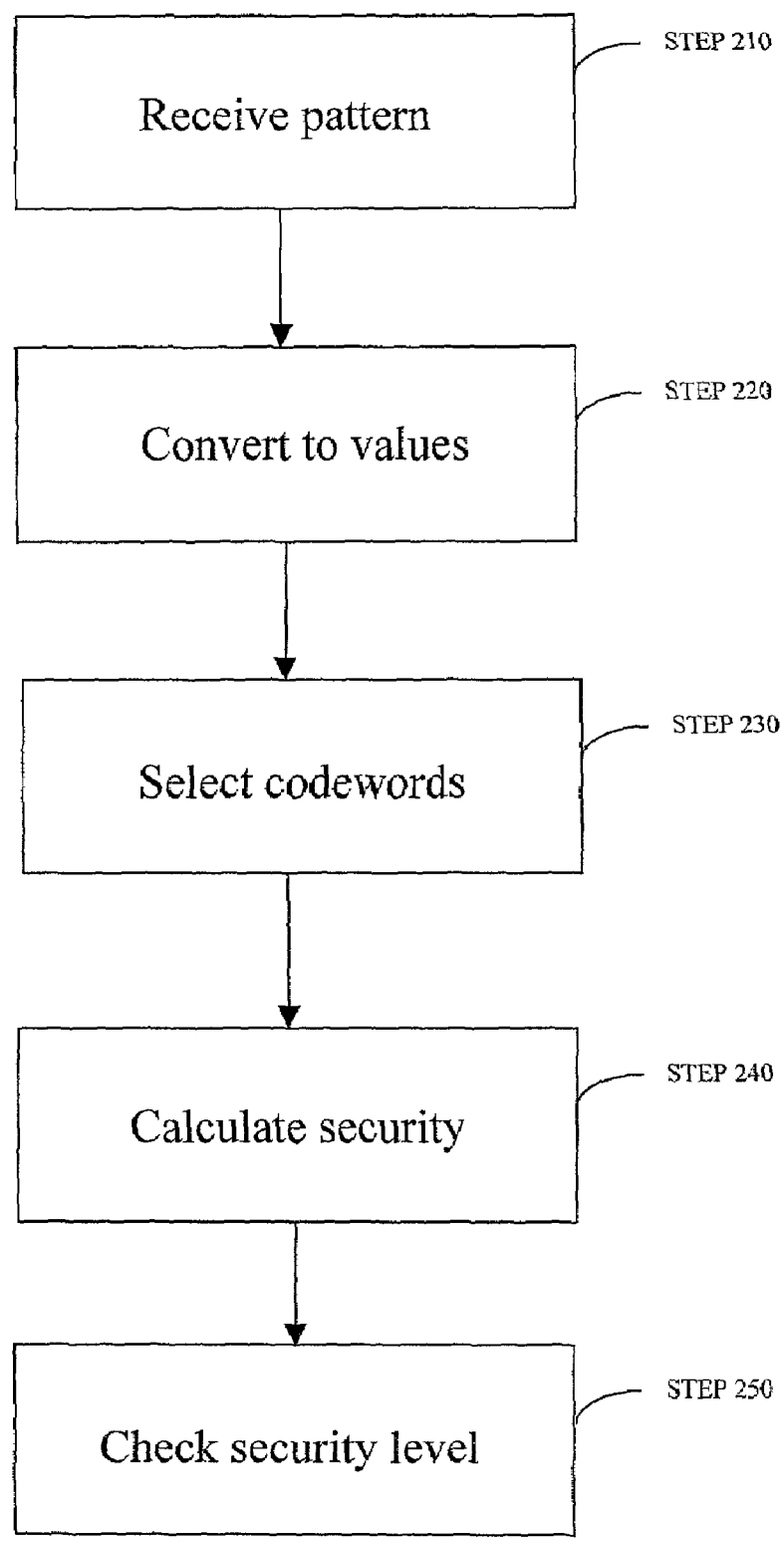
FIG. 2 illustrates a flowchart of an enrollment process in accordance with one embodiment of the invention.

FIG. 2 illustrates a flowchart of the enrollment process according to one embodiment of the invention. The objective of the enrollment process and the use of the enrollment system 110 is to establish a robust visual password that can be used to authenticate the user. The visual password is derived from a secret pattern entered by the user, for example, on the graphical interface 112 (FIG. 1). The visual password is robust if it allows a user to be authenticated by entering an input pattern that approximates the secret pattern within specific parameters. For security purposes, it is better to store the visual password in a form from which it is difficult to recover the secret pattern, yet still possible to verify that the correct visual password was entered.

The graphical interface 112 (FIG. 1) receives a secret pattern from a user (STEP 210). The secret pattern is a sequence of discrete graphical inputs. In some embodiments, a discrete graphical input is the selection of a region on the graphical interface 112.

Figure 3:
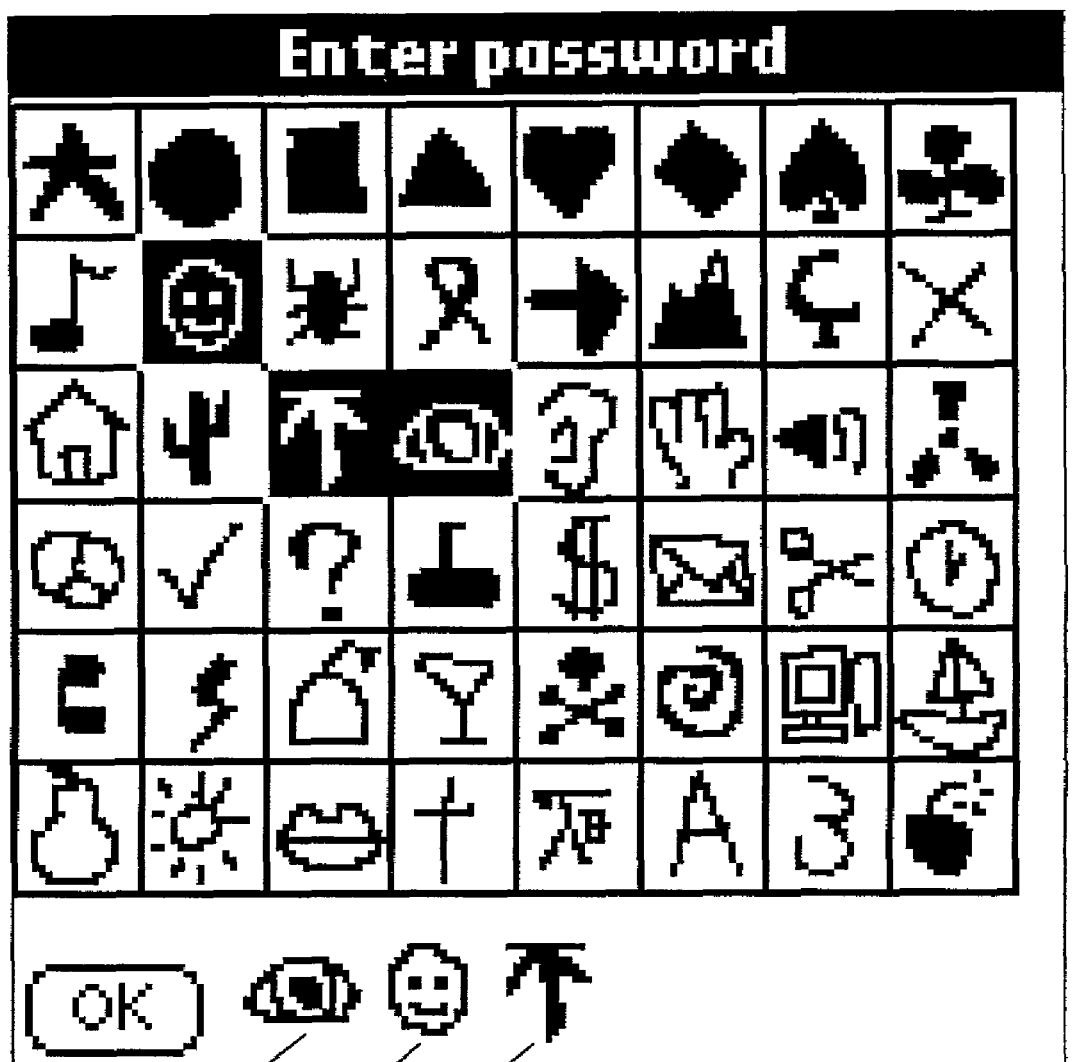
FIG. 3 illustrates an exemplary display on a graphical interface and secret pattern of discrete graphical choices in accordance with one embodiment of the invention.

For example, as illustrated in the example of FIG. 3, one embodiment displays boundaries of a plurality of regions on the graphical interface 112. As further illustrated in FIG. 3, one embodiment displays a unique icon within the boundary of each region on the graphical interface 112. In one embodiment, an icon associated with a region is shown on the bottom of the graphical interface 112 after it is selected. In the embodiment illustrated by FIG. 3, three icons 310, 320, 330 associated with three different regions are shown in order on the bottom of the graphical interface 112 after having been selected.

Figure 4:
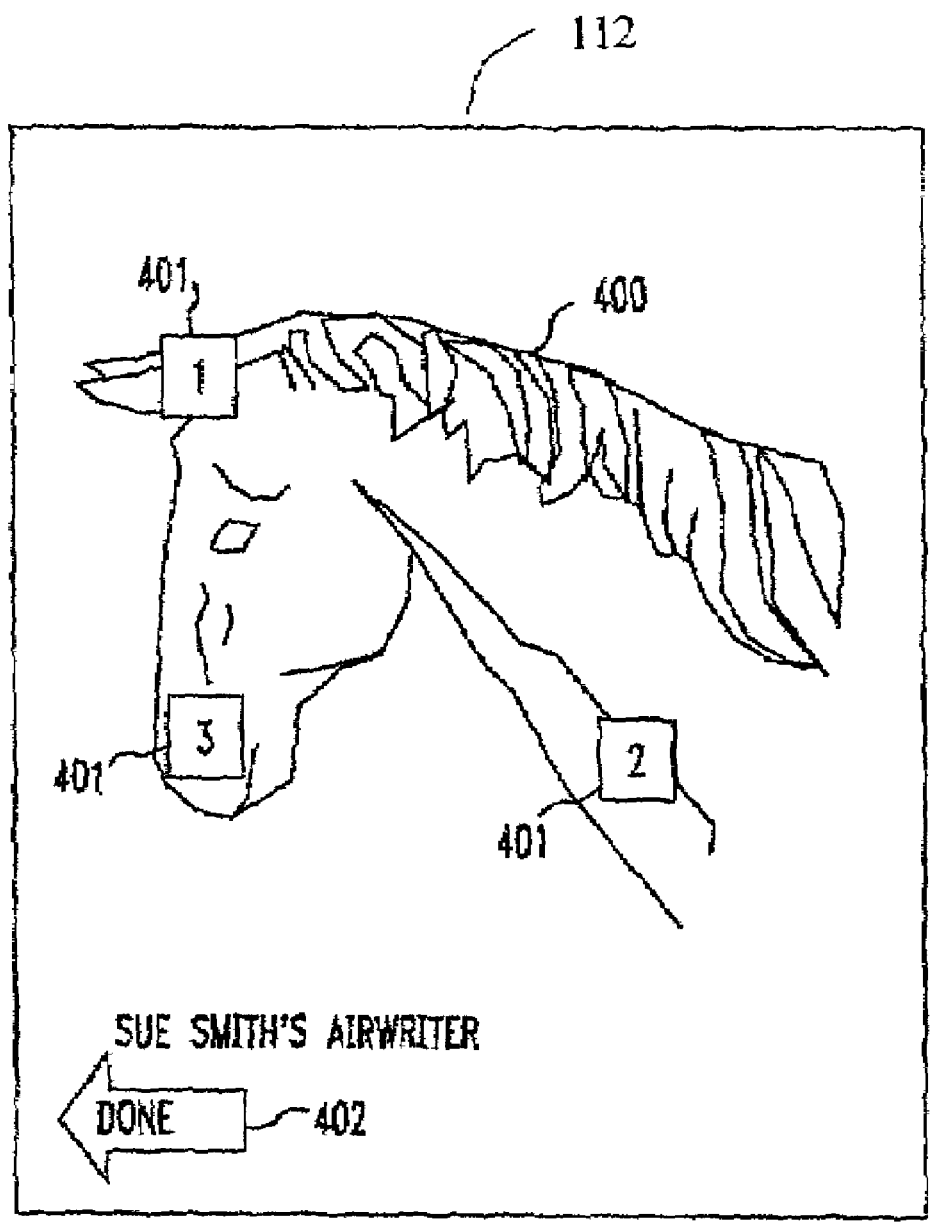
FIG. 4 illustrates an exemplary display on a graphical interface and secret pattern of discrete graphical choices in accordance with one embodiment of the invention.

An alternative approach to the selection of regions in accordance with another embodiment of the invention is illustrated in FIG. 4. In this embodiment, the graphical interface 112 does not indicate the boundaries of the regions that may be selected by the user. In one such embodiment, selected regions are highlighted after selection. In the embodiment illustrated by FIG. 4, three regions 401 are numbered in the order that they were selected and highlighted.

Figure 5:
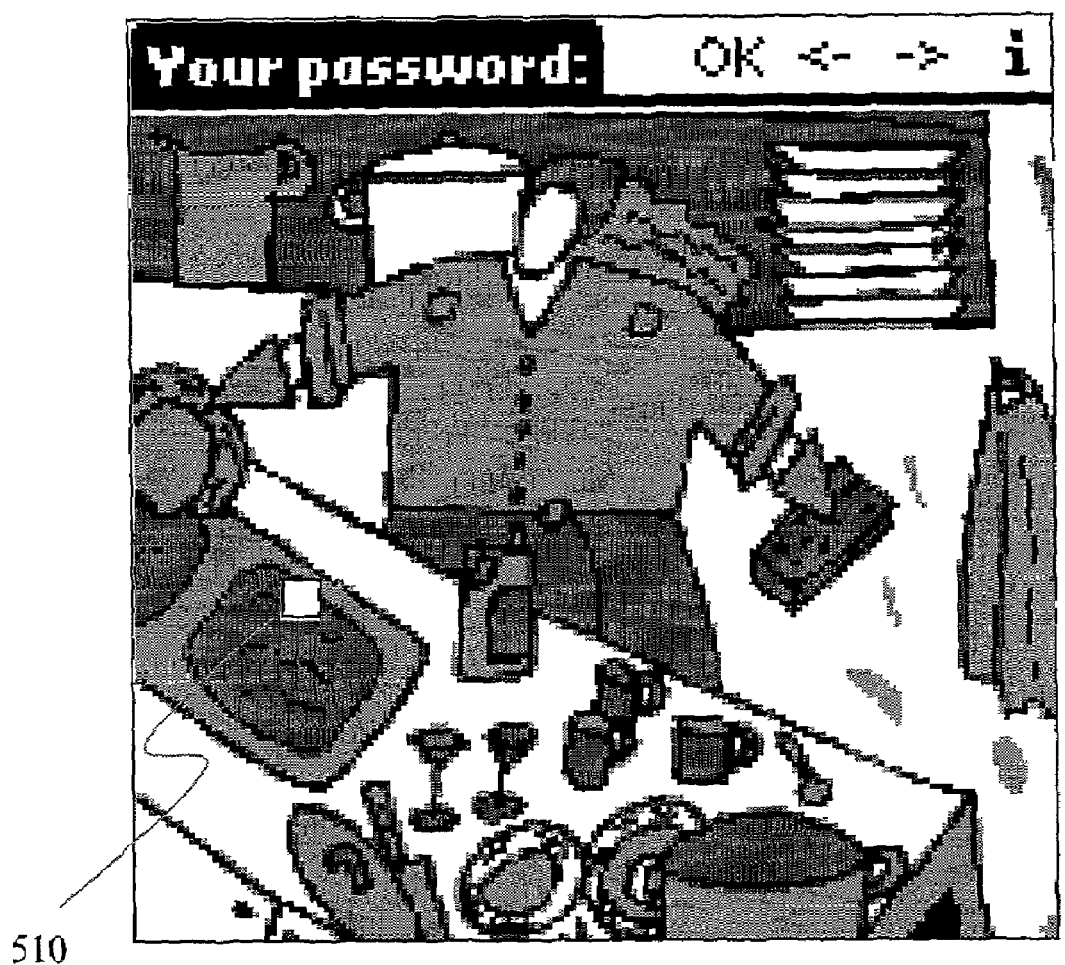
FIG. 5 illustrates an exemplary display on a graphical interface and a discrete graphical choice in accordance with one embodiment of the invention.

A discrete graphical input in another embodiment is the selection of a point. As illustrated in FIG. 5, one embodiment displays an image on the graphical interface 112 while the user is in the process of selecting a point 510. In a related embodiment, the graphical interface 112 displays a new image after the user selects a point. The user can thereby associate a particular point selection with a corresponding image, and use the image as a memory aid. Such an embodiment may have a sequence of images that are first used during the enrollment process to prompt the user to select a sequence of points, which will comprise the secret pattern, and later used to prompt the user to enter the same sequence of points to authenticate himself.

In the context of this discussion, a point is not limited to its strict geometric definition. Instead, a point refers to a relatively small contiguous portion of a graphical interface. A point may be a single pixel of a graphical interface if the input capability allows that level of discrimination. Alternately, a point may be a group of pixels (for example, 10, 20, 100, or more pixels) on the graphical interface, the size of which is approximately consistent with the discrimination level of the input capability associated with the graphical interface, with the user, or with both. A region refers to a larger portion of a graphical interface, and is thereby distinguishable from a point.

Figure 6:
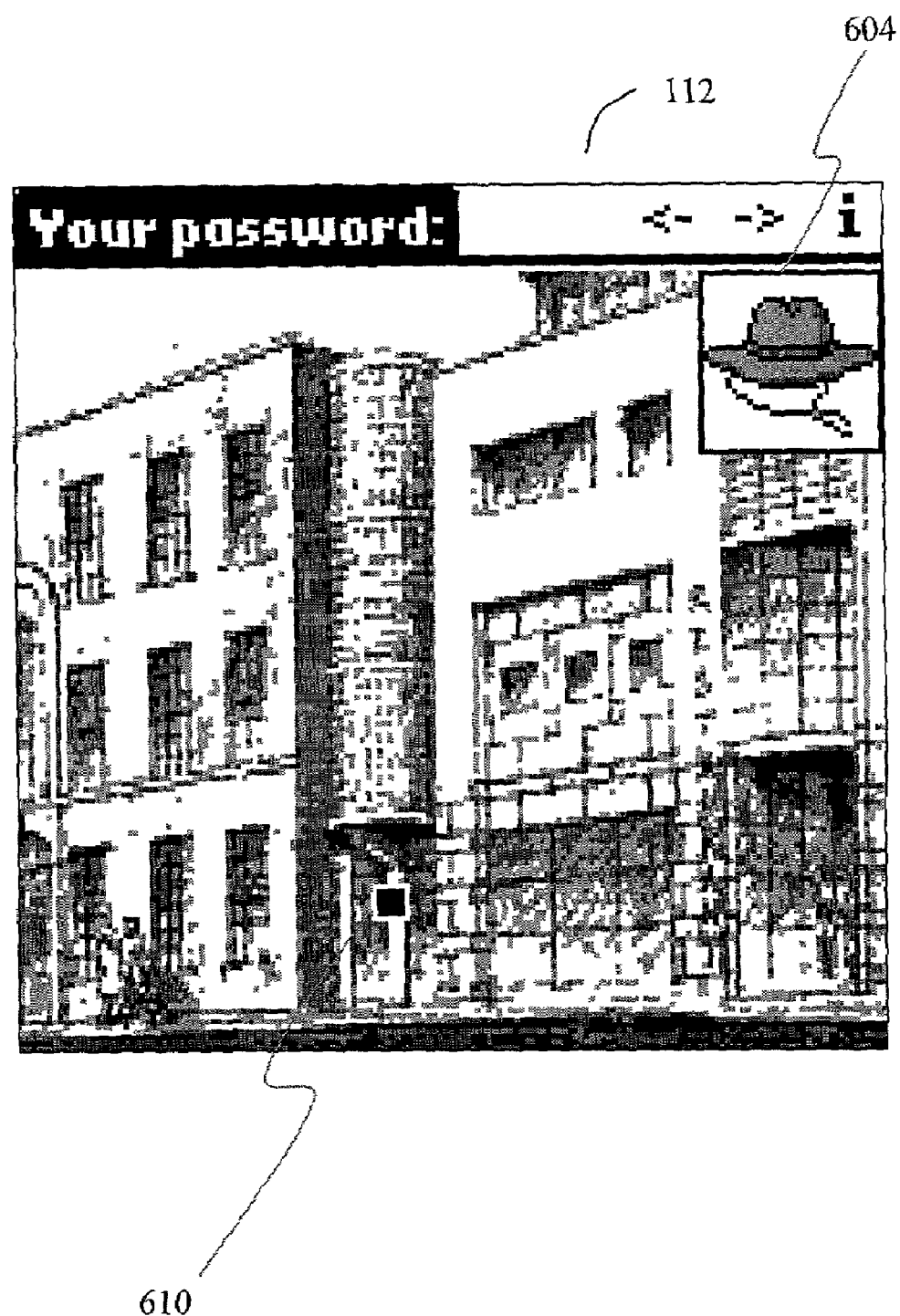
FIG. 6 illustrates an exemplary memory cue presented in response to a portion of a graphical interface being highlighted in accordance with one embodiment of the invention.

As illustrated in FIG. 6, one embodiment presents the user with a memory cue 604 when a point 610 on the graphical interface 112 is highlighted. FIG. 6 illustrates an embodiment in which an icon 604 is associated with a point 610 that may be selected on the graphical interface 112. In such an embodiment, highlighting different points on the graphical display 112 causes different icons to be presented on the graphical display 112. The user can thereby associate a particular point selection with a pop-up icon, and use the icon during the authentication process to remember the point. In alternative embodiments, the memory cue is auditory. In other embodiments, memory cues include visual and auditory cues.

Figure 7:
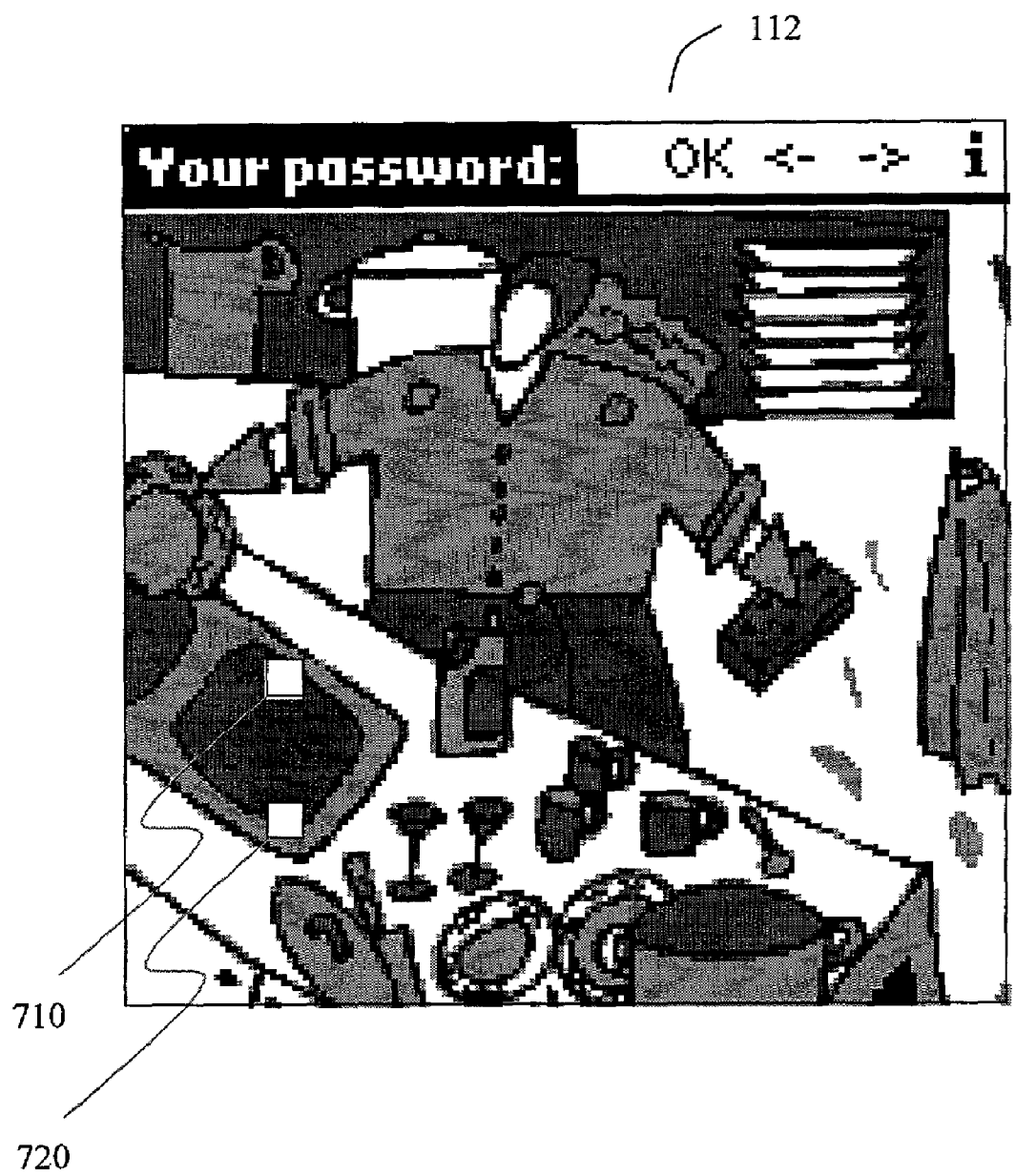
FIG. 7 illustrates an exemplary display on a graphical interface and two discrete graphical choices in accordance with one embodiment of the invention.

As illustrated in FIG. 7, one embodiment presents the user with a choice of points 710, 720 on the graphical interface. A user has the option of selecting point 710 or point 720 in FIG. 7. Related embodiments will present more than two choices to the user. Some embodiments display all available points at once. Other embodiments alternate the available points on display. Such embodiments prevent a user from limiting their selection to the most salient features of an image. When incorporated into embodiments that do not display an image, such embodiments prevent a user from limiting their selection to the most easily remembered points on the graphical interface 112.

Returning again to FIG. 2, the converter 114 (FIG. 1) converts each discrete graphical choice in the sequence of discrete graphical choices into a value to produce a sequence of values (STEP 220). The sequence of discrete graphical inputs, which forms the secret pattern, is thereby converted to a sequence of values. A converter, in one embodiment, simply converts a selected portion of the graphical interface into a value that designates that portion. Existing graphical interfaces 112 often incorporate such a converter 114. In an alternative embodiment, a converter that is distinct from the graphical interface 112 converts a discrete graphical choice into an associated value. In one such embodiment, the value represents a truncated designation of the discrete graphical choice. In another such embodiment, the value represents a compressed designation of the discrete graphical choice. In another such embodiment, the value represents a padded designation of the discrete graphical choice. In another embodiment, each point or region on the graphical interface is associated with an arbitrary string. In one such embodiment the arbitrary string is binary. Such an embodiment may convert a discrete graphical choice into a value by looking up a value associated with the discrete graphical choice on a table.

The codeword generator 116 (FIG. 1) generates a codeword for each value in the sequence of values to produce a sequence of codewords (STEP 230). Since more than one value will generate the same codeword, the generation of a codeword is intended to create an approximation parameter for each value such that all values that fall within the approximation parameter of a specific value will be deemed to match that specific value. Embodiments of the invention may use a portion of an error-correcting code to create the approximation parameter.

Figure 8:
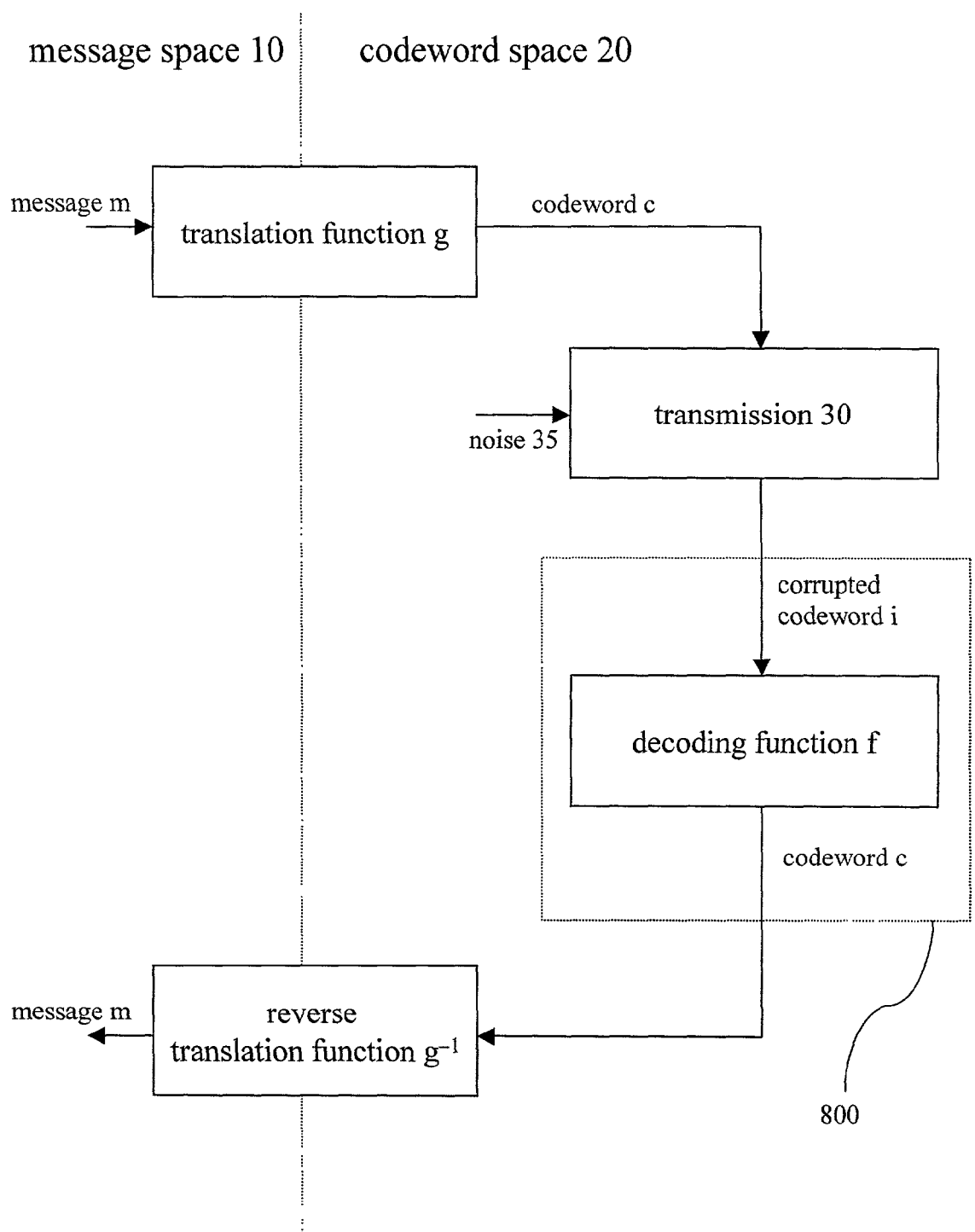
FIG. 8 is a block diagram showing an error-correcting code, a portion of which is used in aspects of the invention.

Referring to FIG. 8, an error-correcting code is used to enable transmission of a message intact over a noisy communication channel. A message m to be transmitted is chosen from message space 10. The set of messages M in message space 10 may be represented mathematically as $M=\{0, 1\}^k$ where each message m in the set of messages M is a binary k-bit string. There are $2^k$ messages in the set of messages M because each bit in the k-bit string can have one of two values.

The message m is provided as input to a translation function g. The translation function g translates the message m into a codeword c in codeword space 20. The translation function g represents a one-to-one mapping of a message m from message space 10 to a codeword c in codeword space 20. Accordingly, for each message m, there is one corresponding codeword c. An error-correcting code for use with a binary set of messages M that are k-bits in length contains a set of codewords C including $2^k$ codewords since there is one codeword c for each of the $2^k$ messages. The operation of the translation function g can be described mathematically as g: M→C. The set of codewords C in codeword space 20 may be described mathematically as $C \subseteq \{0, 1\}^n$ where each codeword c in the set of codewords C is a binary n-bit string. Generally, the message m is different from codeword c at least because codeword c contains redundant elements. If a codeword c contains redundant elements, the length of the codeword c bit string n will be greater than the length of the message m bit string k.

The codeword c is transmitted 30 over a communication channel. Noise 35 may be introduced during transmission 30 so that a corrupted codeword i, which is generally some variation of codeword c, is received at the receiving end of the communication channel. The corrupted codeword i is provided as input to a decoding function f. The decoding function f reconstructs the codeword c from the corrupted codeword i. The redundant elements of the codeword c allow the decoding function to perform this reconstruction.

The decoding function f maps a corrupted codeword i to a codeword c in the set of codewords C. A corrupted codeword i may be an arbitrary n-bit binary string. When the decoding function f is successful, it maps a corrupted codeword i to the nearest codeword c in the set of codewords C. In this context, the nearest codeword c is the codeword c that is the closest by an appropriate metric from the corrupted codeword.

The task of mapping an arbitrary string to its nearest codeword is known as the maximum likelihood decoding problem. Practical classes of codes with polynomial-time solutions to this broad problem are at present unknown. Conventional decoding functions perform a more limited task in that they successfully decode any word that lies within a certain radius of some codeword. Such decoding functions can be used in embodiments described herein.

Generally, when a decoding function f fails, it outputs φ. (Some error correcting codes may operate somewhat differently. For example, list decoding functions f yield a set of candidate codewords, rather than a single correct one. The underlying principles remain the same in such settings.) The operation of the decoding function f can be described mathematically as f: $\{0, 1\}^n \to C \cup \{\phi\}$. The reverse translation function $g^{-1}$ is used upon receipt of a reconstructed codeword c to retrieve the original message m.

The robustness of an error-correcting code depends on the minimum distance of the code. In this description, Hamming distance and Hamming weight will be used as an example of a way to measure the minimum distance of a binary block code. If the Hamming weight of an n-bit binary string u is defined to be the number of '1' bits in u and the Hamming weight of an n-bit string u is denoted by $\|u\|$, then the Hamming distance between two binary bit-strings u and v is defined to be the number of bits in which the two strings differ. The Hamming distance between two binary bit-strings u and v is denoted by $\|u \oplus v\|$.

The minimum distance of a convolution code is defined without reference to Hamming distance or Hamming weight. The use of Hamming distance or Hamming weight as an example here does not indicate any intent to limit an embodiment to these metrics as the only appropriate metrics of the minimum distance of an error-correcting code. Another metric for a set of sequences whose elements are nonbinary, for example, would be the $L_\infty$ norm, a measure of the maximum difference between elements. The $L_\infty$ difference between the sequence u=$\{3, 4, 5\}$ and the sequence v=$\{10, 5, 1\}$ would be 7.

A decoding function f has a correction threshold of size t if it can correct any set of up to t errors. In other words, the decoding function f can successfully decode any corrupted codeword i whose errors are less than or equal to the correction threshold t of the decoding function. The error in a corrupted codeword i can be described as the offset δ from the nearest codeword c. In a binary block code where the Hamming weight of the corresponding offset δ is less than or equal to the bit correction threshold t, the decoding function f will successfully decode a corrupted codeword i to a codeword c in the set of codewords C. This concept is expressed mathematically as follows: given $c \in C$ and $\delta \in \{0, 1\}^n$ with $\|\delta\| \leq t$, then $f(c+\delta) = c$.

Generally, the Hamming distance between any two codewords in the set of codewords C is greater than two times the correction threshold (2t). If the Hamming distance between codewords were not greater than 2t, then a corrupted codeword i would exist that could be decoded into more than one codeword. The neighborhood of a codeword c comprises the subset of all possible corrupted codewords that the decoding function f maps to the codeword c. The decoding function f is generally such that any corrupted codeword i in $f^{-1}(c)$ is closer to the codeword c than to any other codeword.

For example, given a message m that is one bit long (k=1), a codeword c that is three bits long (n=3), a set of two codewords C consisting of 000 and 111 (C={000, 111}), and a decoding function f that computes majority, the correction threshold t for the decoding function f equals one bit error (t=1). The decoding function f maps a corrupted codeword i consisting of three binary bits to 000 if at least two bits are 0 and to 111 if at least two bits are 1. The correction threshold t indicates that the decoding function f can correct a single bit error because changing a single digit in either 000 or 111 does not change the majority.

The coding efficiency of an error-correcting code is the ratio of the bit length of a message m to the bit length of a codeword c. The coding efficiency (k/n) measures the degree of redundancy in the error-correcting code. The lower the coding efficiency, the more redundancy in the codewords. The error-correcting code described in this example has a coding efficiency of ⅓. In general, codes that can correct a large number of errors have a low coding efficiency.

Error-correcting codes may be defined for non-binary spaces as well, and it is intended that the principles described here be extended to such spaces.

The commonest class of error-correcting codes are linear error-correcting codes. Almost all of the error-correcting codes presently used in practice are linear. It is convenient, although not necessary, to choose the decoding function of a linear error-correcting code for use in embodiments of the present invention. One property of linear error-correcting codes that is useful in a number of applications is that it is easy to select a codeword c uniformly at random from the set of codewords C.

It should be noted, however, that an error-correcting code traditionally involves changing a message m to a codeword c before transmission 30. In some situations, however, the translation function g cannot be applied effectively. For instance, when the message m itself contains errors, generating redundancy is problematic. The errors in the message m may well be propagated and reinforced by the redundancy in the corresponding codeword c. This situation exists in the case of a secret pattern that comprises a sequence of discrete graphical choices. It may be difficult for a user to make or repeat discrete graphical choices on a graphical interface without errors; accordingly, a sequence of values that corresponds to a secret pattern should be considered a message m that includes errors. Thus, embodiments of the present invention do not use error-correcting codes in the traditional way.

Embodiments of the present invention use the decoding function f of an error-correcting code to relate a value, which corresponds to a discrete graphical choice, to a codeword c. In some embodiments, the value is treated as a corrupted codeword i in an error-correcting code. In such embodiments, the decoding function f decodes the value into a codeword c as if the value were a corrupted codeword i.

Embodiments of the invention do not make use of the translation function g or the reverse translation function $g^{-1}$ of the error-correcting code. In consequence, such embodiments do not map a message m from the message space 10 to a codeword c from the set of codewords C in codeword space 20. Nor do such embodiments map a codeword c from the set of codewords C in codeword space 20 back to a message m from the message space 10. In fact, such embodiments do not use the message space 10 at all.

The enrollment process illustrated in FIG. 2 includes selecting a codeword c for a value (STEP 230). The value is an n-bit string that corresponds to a discrete graphical choice. The graphical choice may be any sort of discrete input to a graphical interface, such as the selection of a region, an area, or a point on the graphical interface. The codeword c that is selected for a value is also an n-bit string. In some embodiments, STEP 230 involves applying a decoding function f of an error-correcting code to a value. In one such embodiment, the decoding function f is part of a linear error-correcting code.

In one embodiment, the error-correcting code has a dimension d in which codewords are of the form<$Ra\_1, Ra\_2, \ldots, Ra\_d$> such that $a\_i$ is an integer and R is a real-valued code parameter and the decoding function f as applied to vector<$x\_1, x\_2, \ldots, x\_d$> simply rounds each element $x\_i$ to the integer $a\_iR$ that is closest. In a related embodiment, where there are ambiguities, a deterministic or randomized tie-breaking algorithm is used, or both possibilities are checked.

Figure 9:
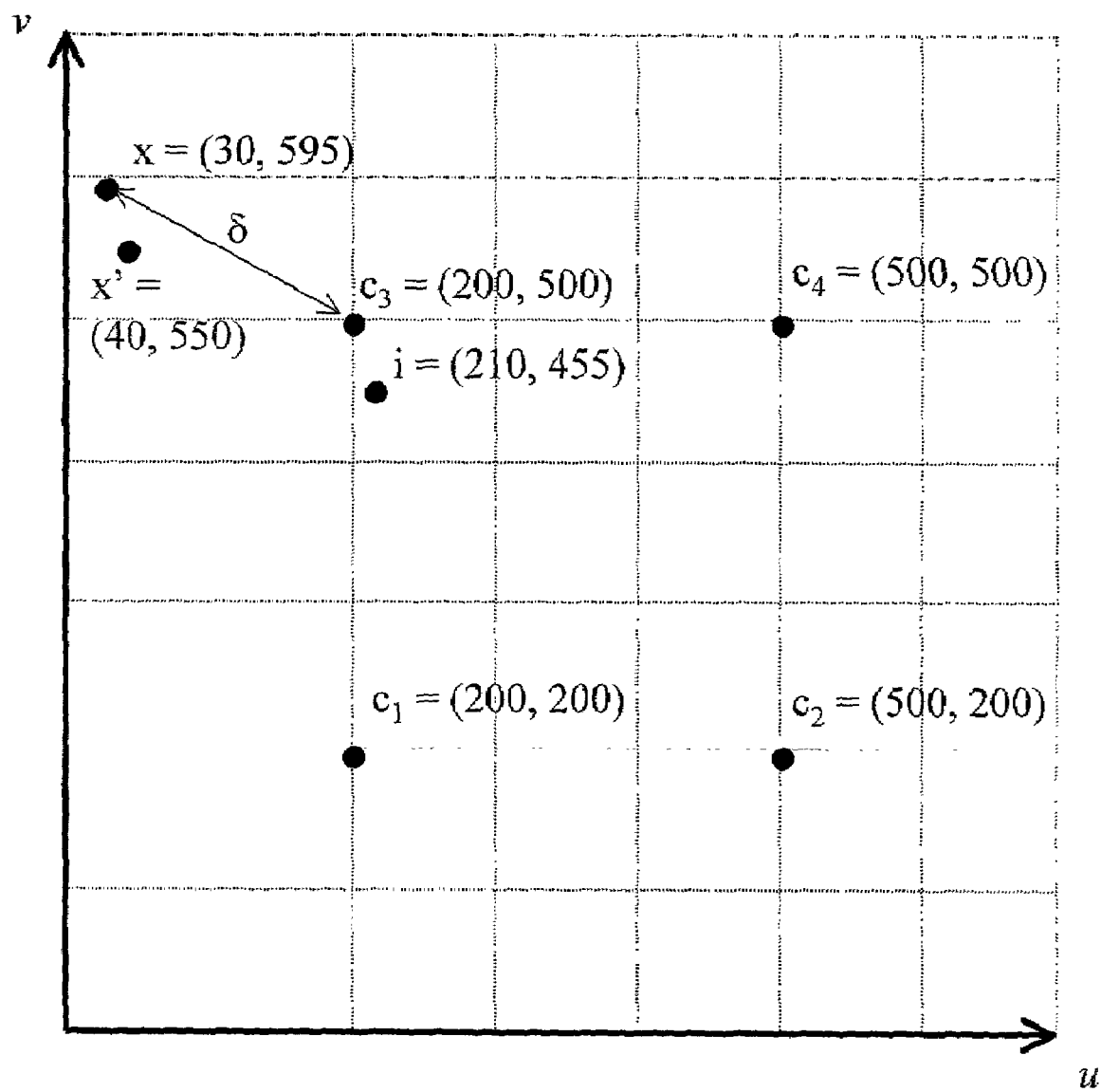
FIG. 9 is a geometric analogy to decoding with unconstrained codewords in accordance with one embodiment of the invention.

FIG. 9 illustrates a geometric analogy for selecting a codeword c for a value x (STEP 230), according to one embodiment of the present invention. The set of codewords C are represented as the set of points $c_1, c_2, c_3$, and $c_4$ on the u-v plane; mathematically expressed as $C=\{c_1, c_2, c_3, c_4\}$. The value x is represented as a point on the u-v plane in FIG. 9 with the coordinates (30, 595). The decoding function f associated with this example, but not shown, selects the codeword c within the set of codewords C that is nearest to the input. In comparison, the decoding function f in its normal use as part of an error-correcting code would select the codeword c that is nearest to the corrupted codeword i. Accordingly, since in this example the input to the decoding function is the value x, the decoding function f selects codeword $c_3$, the codeword nearest to the value x. This process is expressed mathematically as $f(x)=c_3$.

Note that FIG. 9 illustrates a geometric analogy of an embodiment in which the decoding function f has no minimum distance in contravention to the usual case. A decoding function f that uses unconstrained codewords selects the codeword c nearest the value x without limit on its distance between the value x and the nearest codeword c. Such a decoding function f will not always be successful in selecting a codeword c for a value x because, for example, a value x may be equidistant to more than one codeword.

Figure 10:
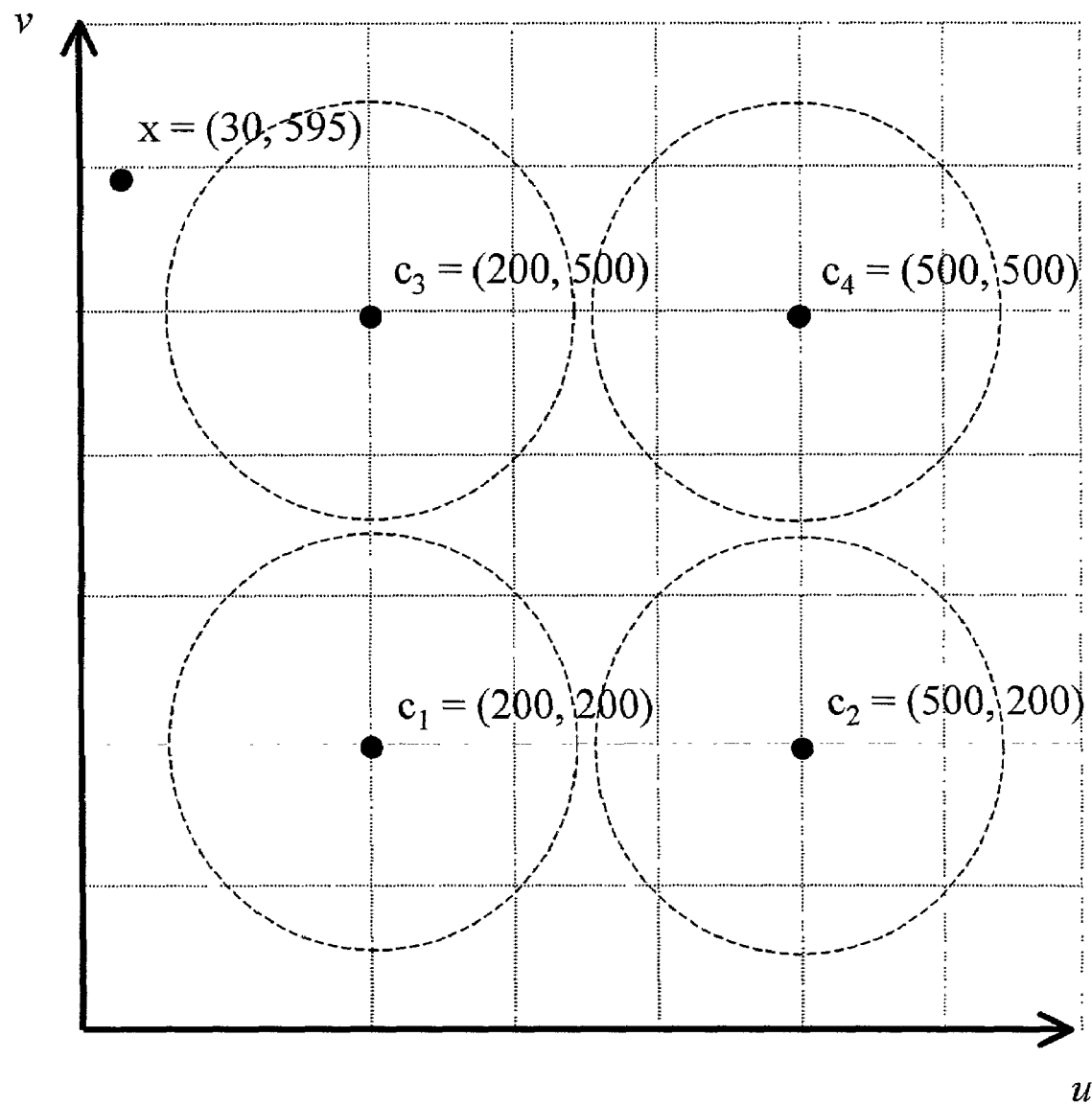
FIG. 10 is a geometric analogy to decoding with constrained codewords in accordance with one embodiment of the invention.

FIG. 10 illustrates a geometric analogy of an embodiment in which the decoding function f selects the codeword c nearest to the value x provided that the distance between the value x and the nearest codeword c falls within the minimum distance of the error-correcting code. In such an embodiment, a decoding function f that uses constrained codewords is used in STEP 230. The dotted line circles surrounding each of the codewords C $\{c_1, c_2, c_3, c_4\}$ represent the boundaries of the neighborhood of values for which the decoding function f will select the included codeword c. The decoding function f will not select the included codeword c for any value outside the dotted line circle that surrounds the codeword c, even if the value outside the dotted line circle is closer to the enclosed codeword c than to any other codeword. For example, the value x in FIG. 10 does not fall within the boundaries of an area that will map to any codeword c. Accordingly, the decoding function f may output $\phi$.

In either of the foregoing embodiments, the amount of information about the value x that is contained in the corresponding codeword c depends on the number of codewords, or the size of the set of codewords C. The larger the set of codewords, the more information that a codeword contains about its associated value x.

Figure 11A:
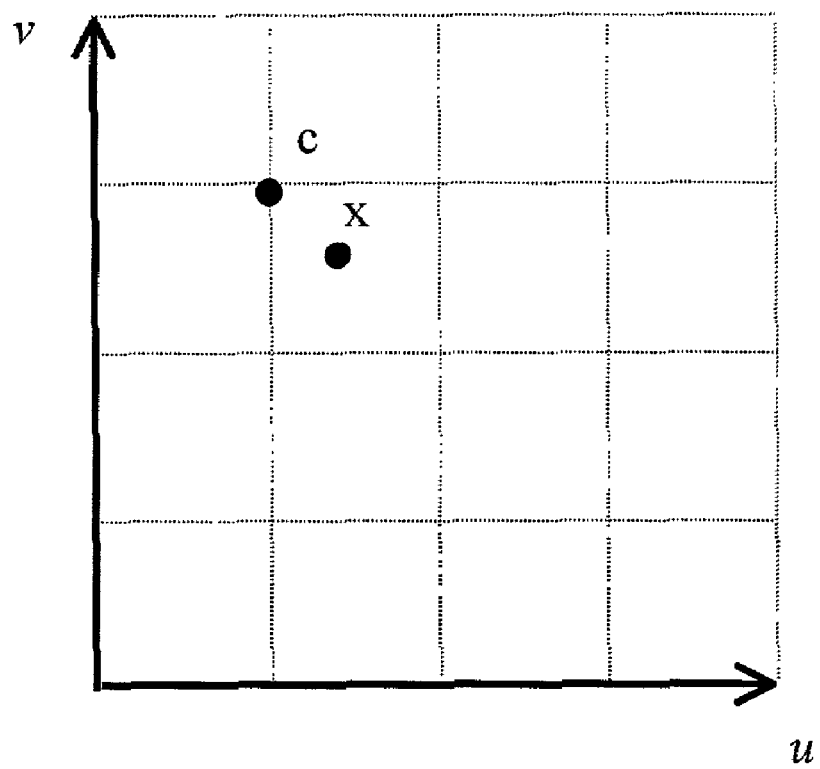
FIGS. 11A and 11B illustrate a comparison of the security levels associated with different numbers of codewords.
Figure 11B:
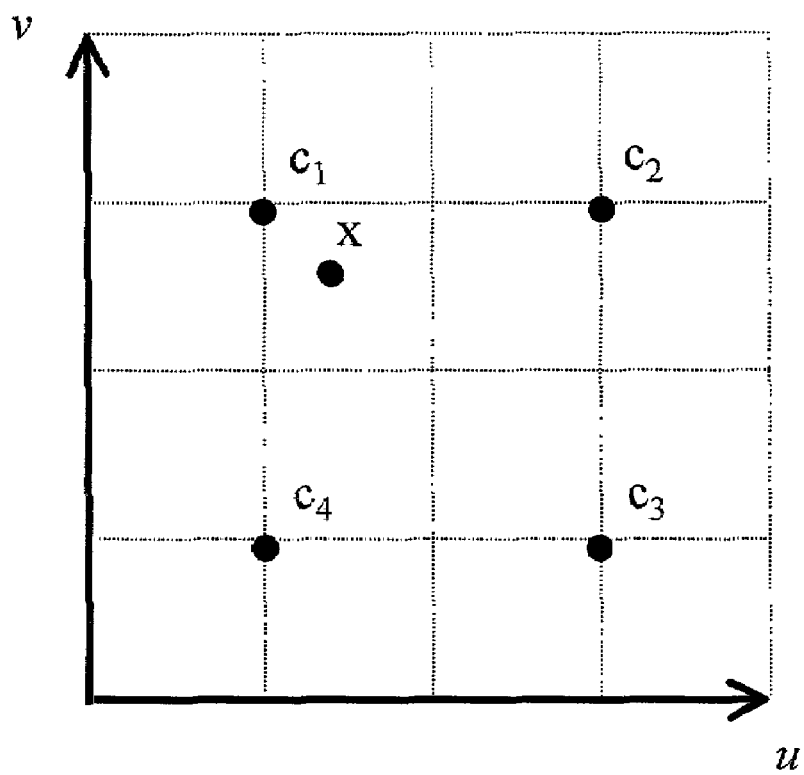

A comparison of FIG. 11A and FIG. 11B illustrates this concept through another geometric analogy. FIG. 11A shows a value x and a set of one codeword C={c}, both as points on a plane. A decoding function f will select the codeword c nearest to the value x in FIG. 11A. Since there is a single codeword c in the set of codewords C in FIG. 11A, the decoding function f will select the codeword c for the value x. Accordingly, knowing that the decoding function selected codeword c for the value x in FIG. 11A provides no information about the true location of the value x on the plane. In comparison, FIG. 11B shows a value x and a set of four codewords, all as points on a plane. A decoding function f will select the nearest codeword $c_1$ for the value x in FIG. 11B. Since there are four codewords in the set of codewords C={$c_1, c_2, c_3, c_4$} in FIG. 11B and the value x is mapped to codeword $c_1$, the location of the value x is bounded. Clearly, the codeword $c_1$ contains a lot more information about the location of value x in FIG. 11B than codeword c does in FIG. 11A even though the value x and the codeword selected by the decoding function f have the same relationship in FIG. 11A and FIG. 11B.

Returning again to FIG. 2, the security calculator 118 (FIG. 1) calculates a security value for a security parameter based on the sequence of codewords (STEP 240). The security of a visual password is dependent on the codewords that are used to enroll and authenticate a user.

In one embodiment, the security parameter is entropy. Entropy H represents the average time to guess the secret pattern. Entropy H can be calculated with the following equation in which a stochiastic variable P takes on the values $P_1, P_2, \ldots, P_n$ with the probabilities $p_1, p_2, \ldots, p_n$:

$$H(P) = -\sum_i p_i \log p_i.$$

Although any logarithm can be used to define entropy, computer security applications customarily use the base 2 logarithm so that entropy can be measured in bits. The base 2 logarithm is used here for that reason.

In another embodiment, the security parameter is minentropy. Minentropy $H_m$ represents the chance of guessing the secret pattern in one guess. Minentropy $H_m$ can be calculated with the following equation in which $p_{max} = \max_i p_i$:

$$H_m(P) = -\log p_{max}.$$

The comparator 120 (FIG. 1) compares the security value for the security parameter to the threshold value 122 (STEP 250). In one such embodiment, the threshold value for minentropy is forty to sixty bits. For comparison, six random lower case letters represent 28 bits of minentropy. If the security value does not meet or exceed the threshold value 122, the graphical interface 112 will prompt the user 126 to enter another secret pattern.

If the security value meets or exceed the threshold value 122, the secret pattern will be accepted. In one such embodiment, the enrollment process of FIG. 2 accepts a secret pattern and saves the sequence of codewords $\{c_1, c_2, \ldots, c_n\}$ produced in STEP 230 as the visual password for use in authenticating the user. In another such embodiment, the process of FIG. 2 accepts a secret pattern and uses the sequence of codewords $\{c_1, c_2, \ldots, c_n\}$ produced in STEP 230 to generate a cryptographic secret, which may be regenerated later from the visual password.

In some embodiments, the enrollment device prompts a user to train himself to remember the accepted secret pattern. In one such embodiment, the graphical interface 112 will prompt the user to enter a point by displaying the associated image. In another embodiment, the graphical interface displays the original discrete graphical choice during or after the user makes a graphical choice.

Figure 12:
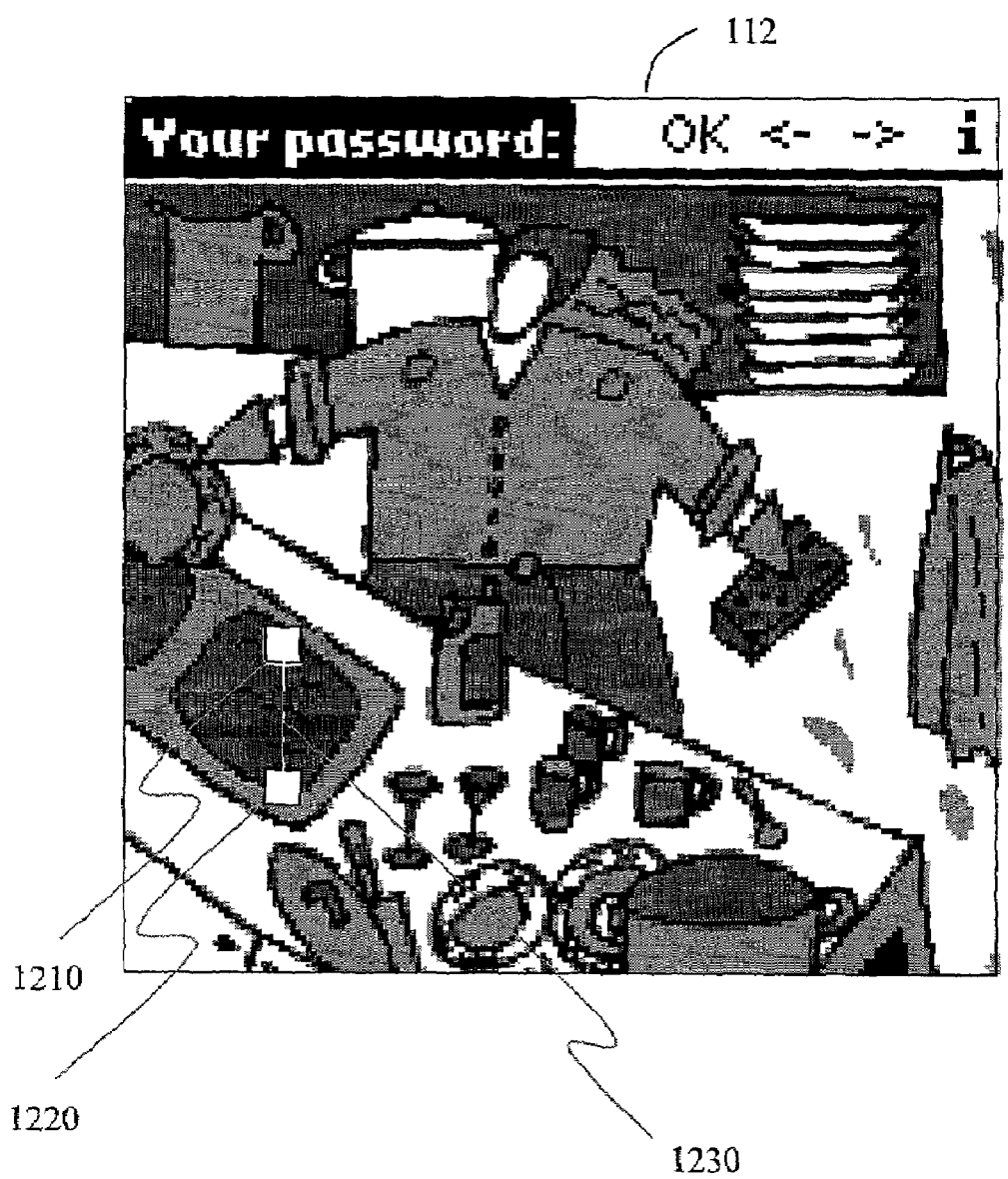
FIG. 12 illustrates an exemplary display on a graphical interface, two discrete graphical choices, and a line between the two discreet graphical choices in accordance with one embodiment of the invention.

Referring to FIG. 12, in one embodiment, the graphical interface 112 displays a line 1230 between the point 1210 in the secret pattern associated with an image and the point 1220 on the image that the user selected during the training process. This line 1230 visually shows the user the difference between the two points. In a similar embodiment, the graphical interface 112 displays the line 1230 during the training selection process.

Figure 13:
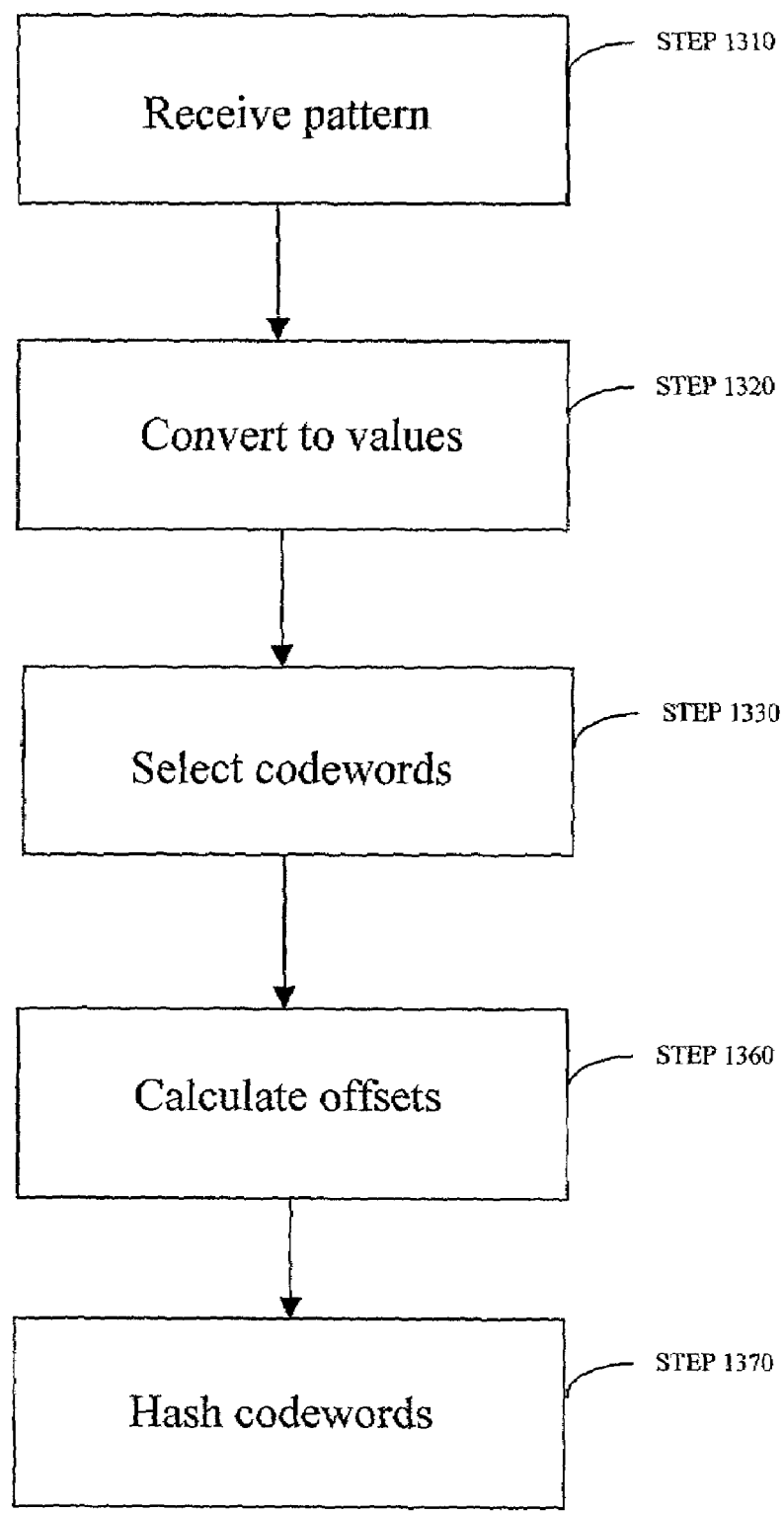
FIG. 13 illustrates a flowchart of an enrollment process in accordance with one embodiment of the invention.

Referring now to FIG. 13, a flowchart for an enrollment process in accordance with another embodiment of the invention is illustrated. STEPS 1310, 1320, and 1330 of FIG. 13 are similar to STEPS 210, 220, and 230 of FIG. 2. Additionally, an offset $\delta$ between each value x and the corresponding selected codeword c is calculated by an offset calculator (STEP 1360). An offset is intended to be used during the authentication process to enable some input values, which would not otherwise do so, to generate the codewords that were generated during the enrollment process. A sequence of offsets $\{\delta_1, \delta_2, \ldots, \delta_n\}$ is thereby generated from the sequence of values and the sequence of codewords. Each offset $\delta$ is an n-bit string that expresses the difference between the two n-bit strings that are a value x and the corresponding codeword c. A value x is likewise equivalent to the corresponding codeword c and the associated offset $\delta$, mathematically expressed as x=c+$\delta$. An offset $\delta$ may be denoted mathematically as $\delta \in \{0, 1\}^n$ such that x=c+$\delta$. In the geometric analogy illustrated in FIG. 9, the offset $\delta$ between a value x and the corresponding codeword $c_3$ is defined as (u−170, v+95) where u and v are the two axes of the u-v plane.

In some embodiments of the enrollment process that include calculating an offset $\delta$, a codeword c is selected at random from the set of codewords associated with a decoding function f for the value x (STEP 1330). In these embodiments, the decoding function f is not used during the enrollment process to decode the value into a codeword. Instead, the calculated sequence of offsets (STEP 1360) are used in conjunction with the decoding function f during the authentication process to bring each input value in the sequence of input values within the correction threshold of the randomly selected codewords.

FIG. 10 can also be used to illustrate a geometric analogy of an embodiment of the enrollment process that does not involve a decoding function f. For example, the codeword $c_2$ may be selected at random from the set of codewords $C=\{c_1, c_2, c_3, c_4\}$ for the value x. In such an embodiment, the fact that codeword $c_2$ is not the codeword closest to the value x does not matter. Such embodiments ignore the minimum distance of the error-correcting code for the purposes of the enrollment process.

Referring again to FIG. 13, the generated sequence of codewords is hashed by a hasher (STEP 1370). Hashing effectively conceals the information that is hashed. In one embodiment, the hashing is done with a one-way function, known as a hash function h, that takes an input and produces an output such that is impractical to figure out what input corresponds to a given output and to find another input that produces the same output. Known hash functions take an arbitrary length input and produce an output of fixed length. This process can be expressed mathematically as h: $\{0, 1\}^n \rightarrow \{0, 1\}^l$. In one embodiment, the hasher may accept an n-bit string representing one or more codewords and produce a longer l-bit string representing the hash of the codewords. In one embodiment, the hash function produces a binary string with a length l of approximately 160 bits. The output of a hash function h is known as the hash of the input. The hash of the sequence of codewords is mathematically expressed as $h(c_1, c_2, \ldots, c_n)$.

Common classes of hash functions include hash functions based on block ciphers and hash functions with dedicated designs. Popular hash functions include SHA-1, MD5, RIPE-MD, HAVAL, and SNERFU, although any appropriate hash function h can be used. In one embodiment, a hash function h built around a block cipher is used (STEP 1370). In another embodiment, a hash function h which has a dedicated design is used (STEP 1370).

In some embodiments, the order of calculating offsets (STEP 1360) and hashing codewords (STEP 1370) is reversed. The hashing does not depend on the calculation of offsets. In other embodiments, calculating offsets (STEP 1360) and hashing codewords (STEP 1370) in FIG. 13 are not sequential, but instead occur with at least some overlap in time.

In one embodiment, the enrollment process accepts a secret pattern and saves a hash of the sequence of codewords $h(c_1, c_2, \ldots, c_n)$ as the stored representation of the visual password. In another embodiment, the enrollment process accepts a secret pattern and saves a hash of each codeword in the sequence of codewords $\{h(c_1), h(c_2), \ldots, h(c_n)\}$ as the stored representation of the visual password. In another embodiment, the enrollment process accepts a secret pattern and saves a sequence of offsets $\{\delta_1, \delta_2, \ldots, \delta_n\}$ as the stored representation of the visual password. Some embodiments of the enrollment process accept a secret pattern and save a hash and a sequence of offsets as the stored representation of the visual password, e.g. $\{h(c_1, c_2, \ldots, c_n), \delta_1, \delta_2, \ldots, \delta_n\}$. Some embodiments may save the hash of the sequence of codewords $h(c_1, c_2, \ldots, c_n)$ and the sequence of offsets $\{\delta_1, \delta_2, \ldots, \delta_n\}$ separately, but use the combination as the stored representation of the visual password. In embodiments that use the combination of the hash of the sequence of codewords $h(c_1, c_2, \ldots, c_n)$ and the sequence of offsets $\{\delta_1, \delta_2, \ldots, \delta_n\}$ as the stored representation of the visual password, but save only a portion thereof, the other portion of the visual password is transmitted for storage elsewhere. In some embodiments, the visual password is referred to as the blob y. The enrollment of a user may be considered to be the fuzzy commitment of a secret password.

Security

The security of the enrollment process of FIG. 13 depends on the visual password being both concealing and binding. For simplicity, the following discussions of security and resilience presume (a) that each value x is drawn uniformly at random from $\{0, 1\}^n$; (b) an embodiment in which the visual password includes a hash of a sequence of codewords that includes a single codeword $h(c_1)$; and (c) isometry of codeword neighborhoods. The concepts also apply to embodiments in which the visual password includes a hash of a sequence of codewords that include a plurality of codewords $h(c_1, c_2, \ldots, c_n)$.

Given that an attacker is able to determine the sequence of codewords from a visual password whereby each codeword c is selected at random from the set of codewords C and the associated value x represents a random binary n-bit string, mathematically $c \in_R C$ and $x \in_R \{0, 1\}^n$, in time T with probability $\rho(T)$. It is then possible for the attacker to invert $h(c_1)$ from a codeword z selected at random from the set of codewords C, mathematically $z \in_R C$, in time T with probability $\rho(T)$.

The time T and probability $\rho(T)$ required to invert $h(c_1)$ are evident from the following. Since each value x and associated codeword $c_1$ are selected independently and uniformly at random, it is clear that the offset $\delta$, mathematically defined as $\delta = x - c_1$, reveals no information about the codeword $c_1$. Therefore, the task of an attacker in determining the sequence of codewords is equivalent to the task, given knowledge only of the hash of the sequence of codewords $h(c_1)$, of finding a codeword z selected from the set of codewords C such that the hash of the codeword z equals the hash of the sequence of codewords $c_1$, mathematically $h(z) = h(c_1)$. The underlying assumption in our derivation of the time T and probability $\rho(T)$ required to invert $h(c_1)$, that it is hard to invert a hash, is somewhat non-standard. It is, however, consistent with common security assumptions about hash functions, such as those provided by the random oracle model. The same result is reached using more canonical assumptions.

Concealment

As explained with respect to FIGS. 11A and 11B, the amount of information about the value x contained in the associated codeword c depends on the size of the set of codewords C. In embodiments that use a hash of the sequence of codewords $h(c_1)$, the information about the value x in the associated codeword $c_1$ represents concealed information. That is, the information about the value x in the associated codeword $c_1$ is concealed by the hash function f. Accordingly, the larger the set of codewords C, the more information about the value x is concealed. In an embodiment in which the visual password includes a hash of a sequence of codewords $h(c_1)$, the amount of information about the value x that is contained in the associated codeword $c_1$ determines the level of concealment in the visual password.

Since error-correcting codes require that a binary set of codewords C contain $2^k$ codewords, k describes the size of a set of codewords C. Thus, a higher k represents more codewords and more concealed information about the value x. Effectively, k is the parameter that dictates the level of concealment of the representation of the visual password. For most applications, a k value of eighty should provide an adequate level of security. Under common assumptions about hash functions, such as the random oracle model, this security level will require an attacker seeking to match a codeword $c_1$ in the visual password an average of $2^{79}$ hash function h computations. This number of calculations is comparable to the computational effort required to factor RSA-1024 or find a collision in SHA-1.

Note that in some embodiments that do not conceal the sequence of codewords itself, the codewords must still be drawn from a large set of codewords C in order to conceal each associated value x. If the set of codewords C, as described by k, is small, then an attacker can guess a codeword $c_1$ and extract the value x from the visual password.

Binding

A password is conventionally defined as binding if it is infeasible for any polynomially bounded player to authenticate himself with two distinct values $x_1$ and $x_2$. The enrollment process of FIG. 13 applies a stronger notion of binding. A visual password is defined as strongly binding if it is infeasible for any polynomially bounded player to produce a value collision. A value collision is a pair of values $x_1$ and $x_2$ that are not close but that nonetheless both produce the same hash of a codeword $h(c_1)$. A pair of values $x_1$ and $x_2$ are close if the decoding function f produces the same codeword $c_1$ from each of the translated values, mathematically denoted as $f(x_1-\delta)=f(x_2-\delta)$. In other words, closeness is defined as within the maximum distance allowed by the underlying error-correcting code. This definition of strongly binding subsumes the conventional definition of binding. Strong binding may, of course, also be defined in a conventional commitment scheme by allowing a value collision to include any two values, $x_1$ and $x_2$, that are distinct. Consequently, if the visual password is strongly binding, then the visual password is also simply binding.

Further, a visual password is strongly binding if the associated hash function h is collision resistant. If an attacker is capable of finding a value collision, then the attacker can find a collision on the hash function h. The length l of the binary bit string created by the hash function h dictates how hard it is to find a value collision. Effectively, l is the parameter that dictates the strength of the binding in a visual password. Under the common assumption that the most effective means of finding a collision in a hash function is a birthday attack whereby pairs of hashes are compared in an effort to find a match, $2^{1/2}$ hashes, or hash calculations, are required to find a match. Hence, a l value of one hundred sixty, which corresponds to the image length of SHA-1, results in a minimum of about $2^{80}$ calculations to match a hash. A strong binding enrollment process is particularly useful for visual passwords.

Resilience

In the context of an error-correcting code, resilience refers the maximum level of corruption, or number of errors, in a corrupted codeword i with which the decoding function f can reconstruct the codeword c. This is also known as the error correction threshold t of the error-correcting code. The error correction threshold t is bounded by the minimum distance between codewords in the set of codewords C (known as the minimum distance of the code). In the context of a robust visual password, resilience refers to the maximum offset δ of a value x from an associated codeword c with which the decoding function can derive the codeword c from the value x. The resilience of a robust visual password is clearly bounded by the error correction threshold t of the error-correcting code used in its construction.

Again, since error-correcting codes require that a binary set of codewords C must contain $2^k$ codewords, k describes the size of a set of codewords C. Thus, a lower k represents fewer codewords and potentially a greater minimum distance of the code which represents a greater potential error-correction threshold t and a greater potential allowable offset δ. A lower k also represents a lower level of security in a robust visual password. Clearly, the resilience of a robust visual password is inversely related to its level of concealment. A robust visual password achieves a tradeoff between resilience and concealment by varying k.

In general, the larger the coding efficiency k/n, the larger the minimum distance achievable in an error-correcting code. This is logical since coding efficiency k/n is proportional to the redundancy permitted in the code. The value n of an error-correcting code is typically fixed by the particular application. Similarly, k should be approximately 80 to prevent brute-force inversion attacks against the underlying hash function h in a robust visual password. Where the parameters k and n are fixed, there is no straightforward way to determine the most efficient error-correcting code. The design of codes to handle particular parameter sets is a broad area of research described in some degree by classic texts. In general, practitioners resort to tables of the best known codes.

To get a sense of the level of resilience attainable in a practical setting, consider an application with a n value of 540. A practitioner may use a table of BCH codes, an efficiently computable class of error-correcting codes, and discover an error-correcting code with a k value of 76, a n value of 511, and a correction threshold t of 85 bits. The value of k in the selected error-correcting code offers an acceptable security level for a robust visual password. A set of codewords C with a length of 511 bits may be used if some data from the application is truncated or compressed. Thus, the selected BCH error-correcting code would enable a practitioner to construct a robust visual password that tolerates errors in any value x of up to almost 17% of the component bits.

Here, each value x has been selected uniformly at random from the set of n-bit binary strings. If a value x were instead drawn from some non-uniform distribution D within the set of n-bit binary strings, then the security level of a robust visual password will be affected to some degree. Some distributions will not result in a significant diminution in the security parameter k, while others will yield a lesser security level. A good security analysis will, in general, require detailed knowledge of the distribution of values in the relevant application. Nonetheless, if a non-uniform distribution D is only slightly non-uniform, only a slight diminution in security will result. Larger dimunitions in security can be compensated for by increasing k. Of course, increasing k may reducing the resilience of the robust visual password.

Similarly, the differences between the original value x and a subsequent value x' have been assumed to be random here. Note, however, that when the differences between the original value x and a subsequent value x' can be correlated, it is sometimes possible to construct a robust visual password that achieve a higher level of resilience than the error correction threshold t of the selected error-correcting code. This is possible because correlations in the differences restrict the number of likely error patterns. If errors tend to occur in sequence, for example, then it is advantageous to use Reed-Solomon codes. Reed-Solomon codes are well-known for their use in the digital recording media such as compact discs, where so-called burst errors are common. An advantage of Reed-Solomon codes is that much progress has been made recently in achieving probable error correction beyond the error correction threshold t for this class of code.

In certain cases, it may even be possible to use such codes to achieve good error correction under independence of bits in e.

Figure 14:
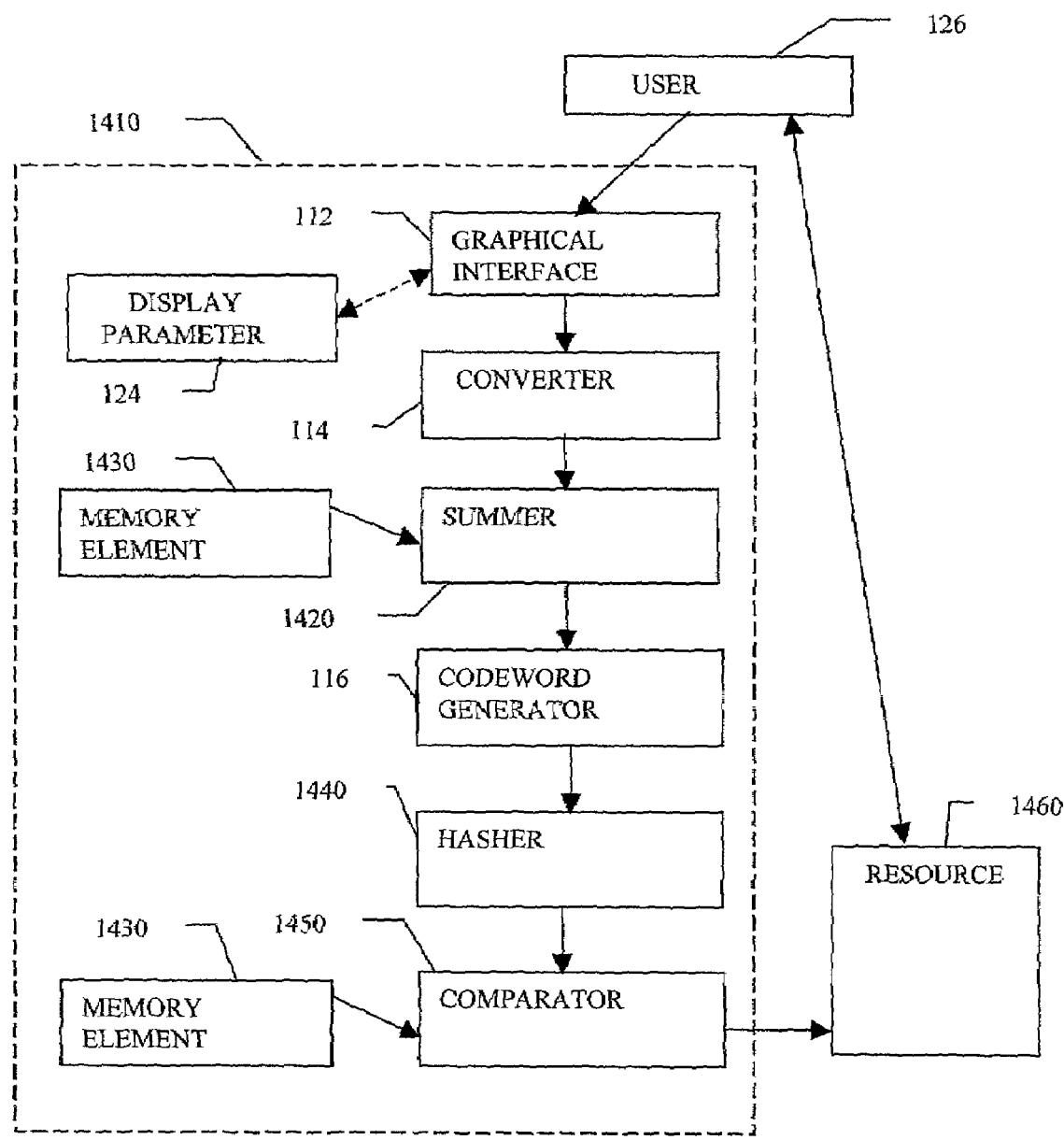
FIG. 14 is a block diagram showing an enrollment system in accordance with one embodiment of the invention.

FIG. 14 illustrates a functional block diagram of an authentication system 1410, a user 126, and a resource 1460. The user 126 provides an input pattern made up of a sequence of discrete graphical choices to a graphical interface 112, which is a component of the authentication system 1410. The display parameter 124, which in one embodiment is an image file, may help the user 126 to recall his secret pattern. In FIG. 14, the input pattern is processed by components of the enrollment system 110 including a converter 114, a summer 1420, in conjunction with a sequence of thresholds in a memory element 1430, a codeword generator 116, a hasher 1440, and a comparator 1450, in conjunction with a hash in a memory element 1430, to determine whether the input pattern corresponds to a visual password established during enrollment.

Entry of an input pattern that corresponds to a visual password established during enrollment will enable the user to access a resource 1650. In embodiments, the resource 1460 is a computer system, a database, or other resource that the user 126 desires to employ. In another embodiment, the resource 1460 provides computational resources or data that the user 126 would like to access. In another embodiment, the resource 1460 is a physical location or entity that the user 126 desires to access or use, such as a room, a locked automobile, or the locked ignition mechanism for an automobile.

A memory element 1430 contains at least a portion of the visual password. The memory element may be RAM or ROM. The memory element may be a component of the authentication system 1410 or a separate element in signal communication with the authentication system 1410. A memory element 1430 in various embodiments is a CD-ROM, a network device, a smartcard, a personal digital assistant (PDA), a magnetic strip which may be attached to a card the approximate size of a credit card, or a bar code.

In one embodiment, the display parameter 124, a converter 114, a summer 1420, in conjunction with a sequence of thresholds in a memory element 1430, a codeword generator 116, a hasher 1440, and a comparator 1450, in conjunction with a hash in a memory element 1430, are implemented as a single software application program executing on a general purpose computer system. In various embodiments, the summer 1420 and the hasher 1440 are individually implemented as software modules, programs, or objects, such as objects implemented in the C++ programming language. In other embodiments, one or more of the summer 1420 and the hasher 1440 are combined in a hardware device or integrated chip, such as an ASIC (application-specific integrated circuit).

The graphical interface 112, converter 114, and codeword generator 116 and comparator 1450 are generally as described with respect to FIG. 1 and FIG. 2.

The converter 114, the codeword generator 116, the security calculator 118, and the comparator 120, in conjunction with a threshold value 122, are all used by the authentication system 1410 to perform the authentication process. Their individual functions are described in more detail with respect to the steps, illustrated in FIG. 15, which are part of the authentication process.

Figure 15:
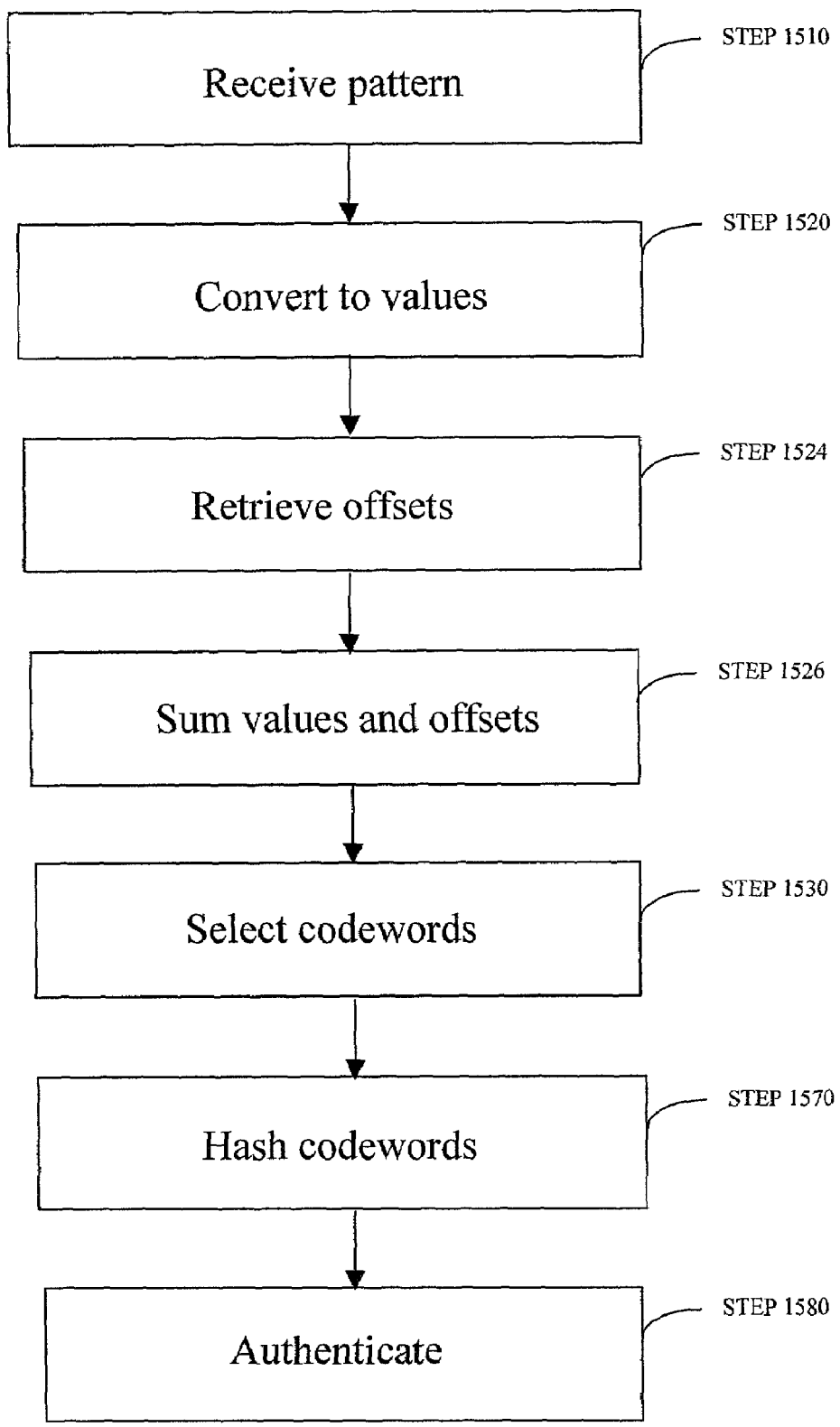
FIG. 15 is a flowchart of an authentication process in accordance with one embodiment of the invention.

FIG. 15 shows a flowchart of an authentication process in accordance with one embodiment of the invention. STEPS 1510, 1520, 1530, and 1570 of FIG. 15 are similar to STEPS 1310, 1320, 1330, and 1370 of FIG. 3. An input pattern is received (STEP 1510) from the user 126 on a graphical interface 112 (FIG. 14). The input pattern may be a sequence of discrete graphical choices, as described above. Each discrete graphical choice in the sequence of discrete graphical choices that form the input pattern is converted to an input value (STEP 1520). A sequence of input values is thereby produced from the input pattern.

The summer 1420 (FIG. 14) retrieves a sequence of offsets (STEP 1524). In one embodiment, the sequence of offsets is retrieved from a memory element 1430 associated with the summer 1420 and recovered from the authentication system 1410 itself. In another embodiment, the sequence of offsets is retrieved by signal communication with a resource 1460 (FIG. 14) that is not part of the authentication device 1410.

Each offset $\delta$ reveals relative information about a value x, specifically the differences between the value x and the associated codeword, but not any absolute information about the value x. As illustrated in the geometric analogy of FIG. 9, an offset $\delta$ reveals the location of a value x relative to the associated codeword $c_3$, but does not reveal any information about the absolute location of the committed codeword $c_3$ or the value x on the u-v plane. Thus, in embodiments in which the sequence of codewords is concealed by a hash function h, such as illustrated in FIG. 15, the only information that the an offset $\delta$ effectively reveals about a value x is that it takes the form (u+170, v−95) for some points (u, v). Subject to this constraint, the value x could otherwise lie anywhere in plane.

Referring again to FIG. 15, the summer 1420 (FIG. 14) sums each offset in the sequence of offsets with the corresponding value in the sequence of input values (STEP 1526). A sequence of intermediate values is thereby generated from the sequence of input values. Referring to FIG. 9, in that geometric analogy, the input value x' corresponds to a discrete graphical choice from the input pattern and is represented by a point on the u-v plane with the coordinates (40, 550). The summing step (STEP 1526) corresponds to the translation of the input value x' by the offset $\delta$ (FIG. 9), just as the value x was translated to reach the committed codeword $c_3$. The intermediate value i, which is treated as a corrupted codeword, is represented in FIG. 9 as a point on the u-v plane with the coordinates (210, 455). In mathematical notation, $i = x' - \delta$.

Referring again to FIG. 15, a codeword generator 116 (FIG. 14) selects a codeword for each intermediate value in the sequence of intermediate values (STEP 1530). A sequence of codewords is thereby generated from the sequence of intermediate values. Embodiments of the invention require the decoding function f associated with, but not necessarily used in, the enrollment process to generate an appropriate codeword for each intermediate value. The decoding function f decodes the intermediate value, which is treated as the corrupted codeword i, into the nearest codeword. During the authentication process, a codeword is not selected at random from the set of codewords associated with an error-correcting code because the goal of the authentication process is to match each codeword that was selected during enrollment. Again using the geometric analogy of FIG. 9, the decoding function selects codeword $c_3$ for the intermediate value i because the intermediate value i is closer to codeword $c_3$ than any other codeword.

In a simple embodiment in which the decoding function f maps any value x to the nearest codeword c without limit on its distance from that nearest codeword c, use of offsets may not be necessary (STEPS 1524 and 1526). Offsets may not be used in an embodiment in which the decoding function f has unconstrained codewords. For example, in the geometric analogy of FIG. 9, the input value x' is nearer the codeword $c_3$ than any other codeword. Thus, if the codewords in FIG. 9 are unconstrained, the decoding function f selects the codeword $c_3$ for the input value x' even without translation by the offset δ.

In a more complex embodiment in which the decoding function f maps a value x to the nearest codeword c provided that its distance from the nearest codeword c falls within the minimum distance of the error-correcting code, the use of an offset δ may be useful. In this embodiment, a decoding function f with constrained codewords is used.

Referring again to geometric analogy of FIG. 10, the decoding function f will select the included codeword c for all values within the dotted line circles surrounding each of the codewords C {$c_1$, $c_2$, $c_3$, $c_4$}. The decoding function will not select the included codeword c for any value outside the dotted line circle surrounding the codeword c, even if the value outside the dotted line circle is closer to the enclosed codeword c than to any other codeword. For example, the value x in FIG. 10 does not fall within the boundaries of an area that will map to any codeword c. Nonetheless, embodiments of the enrollment process may select a codeword c for the value x at random from the set of codewords C associated with the given decoding function f. If codeword $c_2$ is selected for value x randomly, then the offset δ between x and $c_2$ can be represented as (u+470, v−395).

Figure 16:
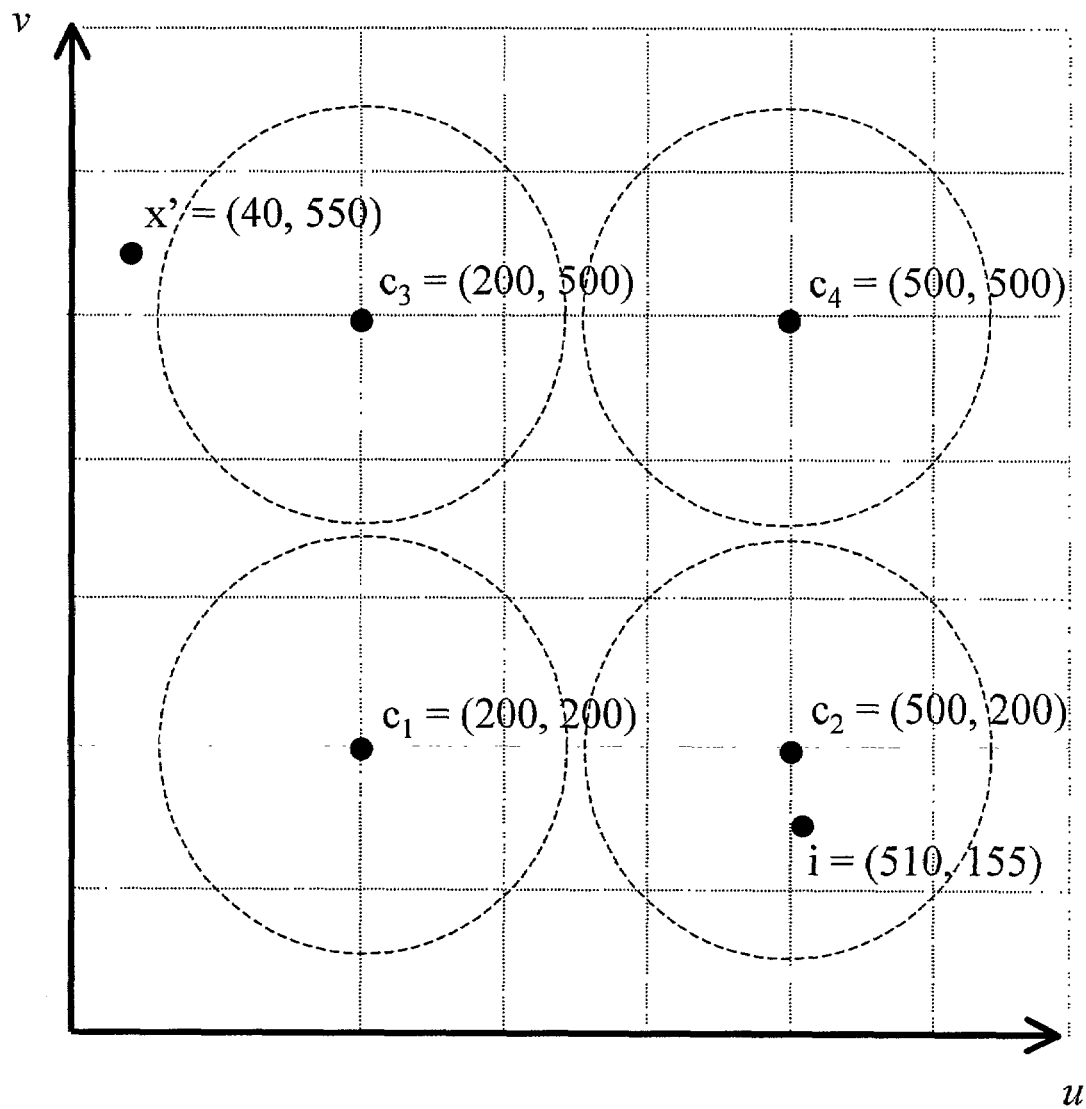
FIG. 16 is a geometric analogy to decoding with constrained codewords and an offset in accordance with one embodiment of the invention.

Referring to FIG. 16, a geometric analogy to the authentication process, which corresponds to the FIG. 10 geometric analogy to the enrollment process, is illustrated. In FIG. 16, an input value x' is translated by the offset δ represented as (u+470, v−395) in the authentication process. When the input value x' is close to value x from the secret pattern, the codeword $c_2$ associated with the value x can be matched by applying the decoding function f to the intermediate value i, generated by translating the input value x' by the offset δ. If the intermediate value i falls within the decoding constraints of the nearest codeword, the decoding function f selects the nearest codeword for the intermediate value i. Here, the decoding function f will select codeword $c_2$ for the intermediate value i because the intermediate value i falls within the constraints of codeword $c_2$.

Referring again FIG. 15, in embodiments of the invention that conceal the sequence of codewords with a hash function h, a hasher 1440 (FIG. 14) hashes the sequence of codewords (STEP 1570). In one embodiment the entire sequence of codewords is used as a single input to a hash function. In another embodiment each codeword in the sequence of codewords is used as a separate input to a hash function. In either of the foregoing embodiments, the hashing step taken in the authentication process must correspond to the hashing step used in the enrollment process.

An alternative embodiment compares the sequence of codewords generated during the enrollment process to the sequence of codewords generated from the input pattern during the authentication process. The hashing step (STEP 1570) is not required in such an embodiment. However, this embodiment has the disadvantage that the unconcealed sequence of codewords generated during the enrollment process may be accessed by an attacker.

In the authentication step (STEP 1580), the generated hash is compared to the hash that is a stored representation of the visual password or a portion thereof. In one embodiment, the enrollment hash is stored in a memory element 1430 (FIG. 14) associated with the comparator 1450 (FIG. 14) and recovered from the authentication system 1410 itself. In another embodiment, the enrollment hash is recovered by signal communication with a resource 1460 that is not part of the authentication device. In another embodiment, the authentication hash is transmitted to a resource that has access to the enrollment hash. In such an embodiment, the authentication device need not include a comparator 1450. The user is authenticated (STEP 1580) if the hashes match. Successful authentication enables the user to gain access to a resource as described above.

An attacker with knowledge of the hash and the sequence of offsets alone would be unable to find an input pattern to authenticate himself. On the other hand, if the user 126 (FIG. 14) enters an input pattern that is close to the secret pattern, it is possible for the resulting sequence of codewords to match the sequence of codewords generated during the enrollment process. Accordingly, the user can be authenticated with an input pattern that is close to the secret pattern given the visual password. Speaking generally, the visual password may be viewed as a fuzzy commitment of the secret password.

Variations, modifications, and other implementations of what is described herein will occur to those of ordinary skill in the art without departing from the spirit and the scope of the invention as claimed.

For example, in one embodiment, the sequence of codewords generated in STEP 230 of FIG. 2 is manipulated to produce a cryptographic secret. Such an embodiment need not include the step of calculating a security value. A method for generating a cryptographic secret from a visual password includes receiving a secret pattern made up of a sequence of discrete graphical choices on a graphical interface, converting each discrete graphical choice into a value to produce a sequence of values corresponding to the sequence of discrete graphical choices, selecting a codeword from a plurality of codewords associated with an error-correcting code for each value to generate a sequence of codewords, and manipulating the sequence of codewords to produce a cryptographic secret. In related embodiments, the method further includes calculating an offset between each value in the sequence of values and the corresponding codeword in the sequence of codewords to generate a sequence of offsets. In embodiments that include calculating an offset, codewords may be selected at random from the plurality of codewords associated with an error-correcting code because the offset can later be used in conjunction with an input pattern to reproduce the randomly selected codeword. Other embodiments apply a decoding function in the selecting step.

In one embodiment, the manipulating step of the method for generating a cryptographic secret from a visual password, consists of applying a hash function to the sequence of codewords. In a related embodiment, another mathematical algorithm is applied to the sequence of codewords, such as addition, exclusive-or, or a more complex cryptographic function. The cryptographic secret in various embodiments can be used as encryption key, a decryption key, a signature key, or the seed for deriving one or more cryptographic keys. The cryptographic secret in various embodiments can be used in a digital signature algorithm or in an identification algorithm.

Accordingly, the invention is to be defined not by the preceding illustrative description but instead by the spirit and scope of the following claims.

What is claimed is:

1. A method for establishing a secret to authenticate a user comprising the steps of receiving a secret pattern on a graphical interface, wherein the secret pattern comprises a sequence of discrete graphical choices;

converting each discrete graphical choice in the sequence of discrete graphical choices into a value to produce a sequence of values, wherein the sequence of values corresponds to the sequence of discrete graphical choices;

for the sequence of values selecting codewords from a plurality of codewords to generate a sequence of codewords, the plurality of codewords defining an error-correcting code;

calculating an offset between each value in the sequence of values and the corresponding codeword in the sequence of codewords to generate a sequence of offsets; and hashing the sequence of codewords to produce a hash of the sequence of codewords.

2. The method of claim 1 wherein a discrete graphical choice in the sequence of discrete graphical choices comprises a selected point on the graphical interface.

3. The method of claim 2 further comprising displaying an image on the graphical interface after receiving the selected point on the graphical interface, wherein each discrete graphical choice in the sequence of discrete graphical choices is associated with one of a plurality of images.

4. The method of claim 3 further comprising prompting a user by displaying one of the plurality of images on the graphical interface; and receiving a match pattern on the graphical interface for comparison with the secret pattern, wherein the match pattern comprises a sequence of match points.

5. The method of claim 4 further comprising, during or after receiving the match pattern on the graphical interface, displaying the selected point associated with the image on the graphical interface.

6. The method of claim 5 further comprising, during or after receiving the match pattern on the graphical interface, displaying a line from a match point to the selected point associated with the image on the graphical interface.

7. The method of claim 2 further comprising providing at least one memory cue by presenting the at least one memory cue in response to a point on the image on the graphical interface being highlighted.

8. The method of claim 7 further comprising associating a first icon from a plurality of icons with a first point on the image on the graphical interface by displaying the first icon in response to the first point being highlighted; and associating a second icon from the plurality of icons with a second point on the image on the graphical interface by displaying the second icon in response to the second point being highlighted.

9. The method of claim 2 further comprising highlighting, for each discrete graphical choice in the sequence of discrete graphical choices, a plurality of points on the graphical interface as alternative graphical choices.

10. The method of claim 1 further comprising storing the sequence of offsets for use in authenticating a user.

11. The method of claim 1 further comprising storing the hash of the sequence of codewords for use in authenticating a user.

12. The method of claim 1 wherein selecting codewords from the plurality of codewords involves for each value in the sequence of values selecting a corresponding codeword from the plurality of codewords to generate the sequence of codewords.

13. A method for authenticating a user comprising the steps of receiving an input pattern on a graphical interface, wherein the input pattern comprises a sequence of discrete graphical choices;

converting each discrete graphical choice in the sequence of discrete graphical choices into an input value to produce a sequence of input values, wherein the sequence of input values corresponds to the sequence of discrete graphical choices;

retrieving a sequence of offsets;

summing each input value from the sequence of input values with the corresponding offset from the sequence of offsets to generate a sequence of intermediate values;

for the sequence of intermediate values selecting codewords from a plurality of codewords to generate a sequence of codewords, the plurality of codewords defining an error-correcting code;

hashing the sequence of codewords to produce a hash of the sequence of codewords; and authenticating a user if the hash matches a stored hash.

14. The method of claim 13 further comprising, prior to authenticating, retrieving a stored hash.

15. The method of claim 13 further comprising, prior to authenticating, transmitting the hash to an authentication device.

16. The method of claim 13 wherein each input value in the sequence of input values is a binary value of fixed length.

17. The method of claim 13 wherein a discrete graphical choice in the sequence of discrete graphical choices comprises a selected region on the graphical interface.

18. The method of claim 13 wherein a discrete graphical choice in the sequence of discrete graphical choices comprises a selected point on the graphical interface.

19. The method of claim 18 further comprising displaying an image on the graphical interface after receiving the selected point on the graphical interface, wherein each discrete graphical choice in the sequence of discrete graphical choices is associated with one of a plurality of images.

20. The method of claim 18 further comprising associating an icon from a plurality of icons with a point on the graphical interface by displaying the icon when the point is highlighted.

21. The method of claim 13 wherein the graphical interface displays a fractal image.

22. The method of claim 13 wherein a discrete graphical choice in the sequence of discrete graphical choices comprises a selected icon from a plurality of icons on the graphical interface.

23. The method of claim 22 wherein the icon on the graphical interface represents a face.

24. The method of claim 13 further comprising allowing access to a resource in response to authenticating the user.

25. The method of claim 24 wherein allowing access to the resource comprises allowing access to at least one of a hardware device, a computer system, a portable computer, a software application, a database, and a physical location.

26. The method of claim 13 wherein selecting codewords form the plurality of codewords involves for each value in the sequence of intermediate values selecting a corresponding codeword from the plurality of codewords to generate the sequence of codewords.

27. An apparatus for establishing a secret to authenticate a user, the apparatus comprising:

a graphical interface capable of receiving graphical input, the graphical interface receiving a secret pattern as graphical input, the secret pattern comprising a sequence of discrete graphical choices;

a converter in signal communication with the graphical interface, the converter converting each discrete graphical choice in the sequence of discrete graphical choices into a value to produce a sequence of values, wherein the sequence of values corresponds to the sequence of discrete graphical choices;

a codeword generator in signal communication with the converter, the codeword generator producing a sequence of codewords by applying a decoding function of an error correcting code to the sequence of values;

an offset calculator in signal communication with the codeword generator, the offset calculator calculating an offset between each value in the sequence of values and the corresponding codeword in the sequence of codewords to generate a sequence of offsets; and a hasher in signal communication with the codeword generator, the hasher applying a hash function to the sequence of codewords to produce a hash of the sequence of codewords.

28. The apparatus of claim 27 wherein a discrete graphical choice in the sequence of discrete graphical choices comprises a selected point on the graphical interface.

29. The apparatus of claim 28 further comprising a point generator in signal communication with the graphical interface, the point generator highlighting a plurality of points on the graphical interface as alternative graphical choices for each discrete graphical choice in the sequence of discrete graphical choices.

30. The apparatus of claim 29 further comprising a memory element in signal communication with the graphical interface, the memory element containing a plurality of images and a sequence of images, wherein receiving a discrete graphical choice in the sequence of discrete graphical choices triggers the graphical interface to display the next image in the sequence of images from the plurality of images contained in the memory element.

31. The apparatus of claim 30 further comprising:

a training logic element in signal communication with the graphical interface, the training logic element prompting a user to enter a match pattern upon receiving the secret pattern by causing the graphical interface to display the first image in the sequence of images, wherein the match pattern is a sequence of match points; and a comparator in signal communication with the graphical interface, the comparator comparing the match pattern to the secret pattern.

32. The apparatus of claim 31 wherein the training logic element, during or after receiving a match point in the sequence of match points on the graphical interface, causes the graphical interface to highlight the selected point associated with the image on the graphical interface.

33. The apparatus of claim 31 wherein the training logic element, during or after receiving a match point in the sequence of match points on the graphical interface, causes the graphical interface to display a line from the match point to the selected point associated with the image on the graphical interface.

34. The apparatus of claim 27 further comprising a memory element in signal communication with the offset calculator, the memory element storing the sequence of offsets from the offset calculator for use in authenticating a user.

35. The apparatus of claim 27 wherein the memory element is in signal communication with the hasher, the memory element storing the hash of the sequence of codewords from the hasher for use in authenticating a user.

36. The apparatus of claim 27 wherein the codeword generator is adapted to produce the sequence of codewords by applying the decoding function to each value in the sequence of values.

37. An apparatus for authenticating a user, the apparatus comprising:

a graphical interface capable of receiving graphical input, the graphical interface receiving an input pattern as graphical input, the input pattern comprising a sequence of discrete graphical choices;

a converter in signal communication with the graphical interface, the converter converting each discrete graphical choice in the sequence of discrete graphical choices into an input value to produce a sequence of input values, wherein the sequence of input values corresponds to the sequence of discrete graphical choices;

a memory element in signal communication with a summer, the memory element containing a sequence of offsets;

the summer in signal communication with the converter and the memory element, the summer summing each input value from the sequence of input values with the corresponding offset from the sequence of offsets to generate a sequence of intermediate values;

a codeword generator in signal communication with the summer, the codeword generator producing a sequence of codewords by applying a decoding function of an error correcting code to the sequence of intermediate values; and a hasher in signal communication with the codeword generator, the hasher applying a hash function to the sequence of codewords to produce a hash of the sequence of codewords for use in authenticating a user.

38. The apparatus of claim 37 further comprising a comparator in signal communication with the hasher, the comparator comparing the hash of the sequence of codewords to a stored hash and producing an authentication signal if the hash of the sequence of codewords matches the stored hash.

39. The apparatus of claim 38 wherein the authentication signal enables access to a resource.

40. The apparatus of claim 39 wherein the authentication signal enables access to at least one of a hardware device, a computer system, a portable computer, a software application, a database, and a physical location.

41. The apparatus of claim 37 further comprising a communication system in signal communication with the hasher, the communication system transmitting the hash of the sequence of codewords to an authentication device and receiving an authentication signal from the authentication device if the hash of the sequence of codewords matches the stored hash.

42. The apparatus of claim 37 wherein a discrete graphical choice in the sequence of discrete graphical choices comprises a selected region on the graphical interface.

43. The apparatus of claim 37 wherein a discrete graphical choice in the sequence of discrete graphical choices comprises a selected point on the graphical interface.

44. The apparatus of claim 37 further comprising a logic element in signal communication with the graphical interface, the logic element causing the graphical interface to display a new image in response to the graphical interface receiving a discrete graphical choice from the sequence of discrete graphical choices, wherein the sequence of discrete graphical choices corresponds to a sequence of images.

45. The apparatus of claim 37 further comprising a logic element in signal communication with the graphical interface, the logic element causing the graphical interface to display at least one memory cue in response to a point on the graphical interface being highlighted.

46. The apparatus of claim 45 wherein the logic element causes a first icon from a plurality of icons to be displayed on the graphical interface in response to a first point on the image on the graphical interface being highlighted; and wherein the logic element causes a second icon from the plurality of icons to be displayed on the graphical interface in response to a second point on the image on the graphical interface being highlighted.

47. The apparatus of claim 37 wherein a discrete graphical choice in the sequence of discrete graphical choices comprises a selected icon from a plurality of icons displayed on the graphical interface.

48. The apparatus of claim 37 wherein the codeword generator is adapted to produce the sequence of codewords by applying the decoding function to each intermediate value in the sequence of intermediate values.

49. A method for generating a cryptographic secret from a visual password, the method comprising the steps of:
receiving a secret pattern on a graphical interface, wherein the secret pattern comprises a sequence of discrete graphical choices;
converting each discrete graphical choice in the sequence of discrete graphical choices into a value to produce a sequence of values, wherein the sequence of values corresponds to the sequence of discrete graphical choices;
for the sequence of values, selecting codewords from a plurality of codewords to generate a sequence of codewords, the plurality of codewords defining an error-correcting code;
manipulating the sequence of codewords to produce a cryptographic secret; and
calculating an offset between each value in the sequence of values and the corresponding codeword in the sequence of codewords to generate a sequence of offsets for use in regenerating the secret.

50. The method of claim 49 wherein selecting comprises applying a decoding function of an error-correcting code to the sequence of values to generate a sequence of codewords.

51. The method of claim 49 wherein manipulating comprises applying a hash function to the sequence of codewords.

52. The method of claim 49 further comprising using the cryptographic secret as an encryption key.

53. The method of claim 49 further comprising using the cryptographic secret in a digital signature algorithm or an identification algorithm.

54. The method of claim 49 wherein selecting codewords from the plurality of codewords involves for each value in the sequence of values selecting a corresponding codeword from the plurality of codewords to generate the sequence of codewords.

* * * * *